US012482390B2

(12) United States Patent
Sun et al.

(10) Patent No.: US 12,482,390 B2
(45) Date of Patent: Nov. 25, 2025

(54) METHOD OF DRIVING DISPLAY, AND DISPLAY DEVICE

(71) Applicants: Beijing BOE Display Technology Co., Ltd., Beijing (CN); Beijing BOE Technology Development Co., Ltd., Beijing (CN)

(72) Inventors: Zhihua Sun, Beijing (CN); Yinlong Zhang, Beijing (CN); Qiujie Su, Beijing (CN); Feng Qu, Beijing (CN); Jing Liu, Beijing (CN); Yanping Liao, Beijing (CN); Xibin Shao, Beijing (CN)

(73) Assignees: Beijing BOE Display Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/601,014

(22) Filed: Mar. 11, 2024

(65) Prior Publication Data

US 2024/0212553 A1 Jun. 27, 2024

Related U.S. Application Data

(60) Continuation of application No. 18/182,479, filed on Mar. 13, 2023, now Pat. No. 11,972,717, which is a (Continued)

(30) Foreign Application Priority Data

Sep. 14, 2020 (CN) ......................... 202010964060.0

(51) Int. Cl.
*G09G 3/20* (2006.01)

(52) U.S. Cl.
CPC ............. *G09G 3/20* (2013.01); *G09G 3/2092* (2013.01); *G09G 2310/0205* (2013.01);

(Continued)

(58) Field of Classification Search
None
See application file for complete search history.

(56) References Cited

U.S. PATENT DOCUMENTS 6,072,457 A 6/2000 Hashimoto et al.
7,489,290 B2 2/2009 Shin (Continued)

FOREIGN PATENT DOCUMENTS

CN 1674073 A 9/2005
CN 101359143 A 2/2009

(Continued)

OTHER PUBLICATIONS

U.S. Patent Office issued prosecution for U.S. Appl. No. 17/341,756, filed Jun. 8, 2021, including: Notice of Allowance and Fees Due (PTOL-85) and Examiner Initiated Interview Summary issued Dec. 21, 2022, 12 pages; Non-Final Rejection issued Sep. 12, 2022, 12 pages; Restriction Requirement issued Jun. 15, 2022, 6 pages; 30 pages total.

(Continued)

*Primary Examiner* — Dorothy Harris
(74) *Attorney, Agent, or Firm* — Westman, Champlin & Koehler, P.A.

(57) ABSTRACT

Embodiments of the present disclosure provide a method of driving display, and a display device. The method of driving display includes: scanning, progressively or rows by rows, a plurality of sub-pixels arranged in an N×M array, to turn on each row of sub-pixels scanned, so that a duration in which two adjacent rows of sub-pixels are simultaneously in an ON state is greater than or equal to two times a unit scanning (Continued)

time, wherein the unit scanning time is a time required for scanning a row of sub-pixels, N is an integer greater than 1, and M is an integer greater than 1; and applying data signals to at least two rows of sub-pixels simultaneously in the ON state, so that a duration of applying the data signals to each row of sub-pixels is greater than the unit scanning time.

12 Claims, 12 Drawing Sheets

Related U.S. Application Data division of application No. 17/341,756, filed on Jun. 8, 2021, now Pat. No. 11,636,793.

(52) U.S. Cl.
CPC ............... *G09G 2310/0218* (2013.01); *G09G 2310/0224* (2013.01); *G09G 2310/0251* (2013.01); *G09G 2310/0267* (2013.01); *G09G 2310/0275* (2013.01); *G09G 2310/0278* (2013.01); *G09G 2310/0286* (2013.01); *G09G 2310/08* (2013.01)

(56) References Cited

U.S. PATENT DOCUMENTS 8,199,080 B2 6/2012 Okamoto et al.
8,760,381 B2 6/2014 Suzuki et al.
9,230,498 B2 1/2016 Xu
9,305,513 B1 4/2016 Novoselov et al.
10,008,170 B2 6/2018 Wang et al.
11,636,793 B2 * 4/2023 Sun ...................... G09G 3/2092 345/204
11,972,717 B2 * 4/2024 Sun .......................... G09G 3/20
2002/0044119 A1 * 4/2002 Kwon .................. G09G 3/3648 345/87
2005/0110726 A1 5/2005 Shin
2009/0033651 A1 * 2/2009 Okamoto ................. G09G 3/20 345/214
2009/0128541 A1 5/2009 Tsai et al.
2011/0128259 A1 * 6/2011 Suzuki ................... G09G 3/003 345/204
2012/0293536 A1 * 11/2012 Yonemaru ............ G09G 3/3648 345/589
2013/0050171 A1 2/2013 Tsai
2014/0168281 A1 6/2014 Ahn et al.
2014/0176527 A1 * 6/2014 Liu ...................... G09G 3/3648 345/212
2015/0145838 A1 5/2015 Xu
2017/0229084 A1 8/2017 Wang et al.
2019/0066560 A1 2/2019 Mi et al.
2019/0355309 A1 11/2019 Miwa et al.
2020/0043420 A1 2/2020 Kang et al.

FOREIGN PATENT DOCUMENTS

| | | | |
|---|---|---|---|
| CN | 101359441 | A | 2/2009 |
| CN | 201204029 | Y | 3/2009 |
| CN | 102081914 | A | 6/2011 |
| CN | 103606360 | A | 2/2014 |
| CN | 104123923 | A | 10/2014 |
| CN | 105225649 | A | 1/2016 |
| CN | 105280153 | A | 1/2016 |
| CN | 109509455 | A | 3/2019 |
| CN | 109599070 | A | 4/2019 |
| CN | 109686296 | A | 4/2019 |
| JP | H10253987 | A | 9/1998 |
| JP | 2005165038 | A | 6/2005 |
| JP | 2005-189860 | A | 7/2005 |
| TW | 201310429 | A | 3/2013 |

OTHER PUBLICATIONS

Examination Report for Indian Patent Application No. 202247046938, dispatched Aug. 23, 2023, 7 pages.
first Office Action for Chinese Patent Application No. 202180002547. 3, dated Aug. 3, 2023, 14 pages.
Notice of Allowance and Fee(s) Due for U.S. Appl. No. 18/182,479, mailed Jan. 31, 2024, 11 pages.
Extended European Search Report, for European Patent Application No. 21866119.7, dated Feb. 2, 2024, 16 pages.

* cited by examiner

METHOD OF DRIVING DISPLAY, AND DISPLAY DEVICE

CROSS-REFERENCE TO RELATED APPLICATION

This application is a continuation of U.S. patent application Ser. No. 18/182,479, filed on Mar. 13, 2023, which is a divisional of U.S. patent application Ser. No. 17/341,756, filed on Jun. 8, 2021, which issued as U.S. Pat. No. 11,636,793, on Apr. 25, 2023, which claims the priority of Chinese Patent Application No. 202010964060.0, filed on Sep. 14, 2020, the entire contents of which are incorporated herein by reference in their entireties.

TECHNICAL FIELD

The present disclosure relates to a field of display technology, and in particular to a method of driving display, and a display device.

BACKGROUND

With a technical progress, display devices are developing in a direction of large-size and high-resolution. However, with an increase of a size and a resolution of a display device, a charging time for each row of pixels becomes shorter and shorter, so that a charging rate of pixels cannot meet requirements, and display may be affected.

SUMMARY

Embodiments of the present disclosure provide a method of driving display, including:

scanning, progressively or rows by rows, a plurality of sub-pixels arranged in an N×M array, to turn on each row of sub-pixels scanned, so that a duration in which two adjacent rows of sub-pixels are simultaneously in an ON state is greater than or equal to two times a unit scanning time, wherein the unit scanning time is a time required for scanning a row of sub-pixels, N is an integer greater than 1, and M is an integer greater than 1; and applying data signals to at least two rows of sub-pixels simultaneously in the ON state, so that a duration of applying the data signals to each row of sub-pixels is greater than the unit scanning time.

For example, the method further includes:

turning on a nth row of sub-pixels and a n+1th row of sub-pixels simultaneously in a first period, where n is an integer, 1≤n≤N−1; and turning on a n+2th row of sub-pixels and a n+3th row of sub-pixels simultaneously in a second period, and applying data signals to the nth row of sub-pixels and the n+1th row of sub-pixels, wherein a length of the second period is greater than or equal to two times the unit scanning time.

For example, the applying data signals to the nth row of sub-pixels and the n+1th row of sub-pixels includes: applying one of a nth row of data signals and a n+1th row of data signals to the nth row of sub-pixels and the n+1th row of sub-pixels.

For example, the second period includes a first sub-period and a second sub-period, and the applying data signals to the nth row of sub-pixels and the n+1th row of sub-pixels includes:

applying a nth row of data signals to the nth row of sub-pixels and the n+1th row of sub-pixels in the first sub-period of the second period; and applying a n+1th row of data signals to the nth row of sub-pixels and the n+1th row of sub-pixels in the second sub-period of the second period.

For example, the method further includes:

turning on a nth row of sub-pixels and a n+1th row of sub-pixels sequentially in a first period, where n is an integer, 1≤n≤N−3;

turning on a n+2th row of sub-pixels and a n+3th row of sub-pixels sequentially in a second period, and applying one of a nth row of data signals and a n+1th row of data signals to the nth row of sub-pixels and the n+1th row of sub-pixels, wherein a length of the second period is greater than or equal to two times the unit scanning time; and turning off the nth row of sub-pixels in a third period, and applying one of a n+2th row of data signals and a n+3th row of data signals to the n+1th row of sub-pixels, the n+2th row of sub-pixels and the n+3th row of sub-pixels.

For example, a length of the first period is equal to two times the unit scanning time, and a length of the second period is equal to two times the unit scanning time.

For example, a length of the first period is equal to two times the unit scanning time, a length of the second period is equal to two times the unit scanning time, and a length of the third period is equal to the unit scanning time.

The embodiments of the present disclosure further provide a method of driving display, including:

in a first frame, scanning progressively or at an interval of at least one row, a plurality of sub-pixels arranged in an N×M array, to turn on each row of sub-pixels scanned, so that a duration in which two rows of sub-pixels sequentially turned on are simultaneously in an ON state is greater than or equal to two times a unit scanning time; and applying data signals to each row of sub-pixels turned on, so that a duration of applying the data signals to a part of the plurality of sub-pixels is greater than the unit scanning time, wherein the unit scanning time is a time required for scanning a row of sub-pixels, N is an integer greater than 1, and M is an integer greater than 1; and in a second frame, scanning progressively or at an interval of at least one row, a plurality of sub-pixels arranged in an N×M array, to turn on each row of sub-pixels scanned, so that a duration in which two rows of sub-pixels sequentially turned on are simultaneously in an ON state is greater than or equal to two times the unit scanning time; and applying data signals to each row of sub-pixels turned on, so that a duration of applying the data signals to the other part of the plurality of sub-pixels is greater than the unit scanning time.

For example, the method further includes:

in the first frame, scanning odd-numbered rows of the plurality of sub-pixels progressively to turn on each odd-numbered row of sub-pixels scanned, so that a duration in which two adjacent odd-numbered rows of sub-pixels are simultaneously in an ON state is greater than or equal to two times the unit scanning time; and applying data signals to each odd-numbered row of sub-pixels turned on, so that a duration of applying the data signals to the each odd-numbered row of sub-pixels is greater than or equal to two times the unit scanning time; and in the second frame, scanning even-numbered rows of the plurality of sub-pixels progressively to turn on each even-numbered row of sub-pixels scanned, so that a duration in which two adjacent even-numbered rows of sub-pixels are simultaneously in an ON state is greater than or equal to two times the unit scanning time; and applying data signals to each even-numbered row of sub-pixels turned on, so that a duration of applying the data signals to the each even-numbered row of sub-pixels is greater than or equal to two times the unit scanning time.

For example, the method further includes:

in the first frame, scanning the plurality of sub-pixels progressively to turn on each row of sub-pixels scanned, so that a duration in which two adjacent rows of sub-pixels are simultaneously in an ON state is greater than two times the unit scanning time; and applying data signals to each row of sub-pixels turned on, so that a duration of applying the data signals to each odd-numbered row of sub-pixels is greater than the unit scanning time, and a duration of applying the data signals to each even-numbered row of sub-pixels is less than the unit scanning time; and in the second frame, scanning the plurality of sub-pixels progressively to turn on each row of sub-pixels scanned, so that a duration in which two adjacent rows of sub-pixels are simultaneously in an ON state is greater than two times the unit scanning time; and applying data signals to each row of sub-pixels turned on, so that a duration of applying the data signals to each even-numbered row of sub-pixels is greater than the unit scanning time, and a duration of applying the data signals to each odd-numbered row of sub-pixels is less than the unit scanning time.

For example, the method further includes:

turning on a 2k−1th row of sub-pixels in a first period of the first frame, where k is an integer, 1≤k≤(N−2)/2; and turning on a 2k+1th row of sub-pixels in a second period of the first frame, and applying a 2k−1th row of data signals to the 2k−1th row of sub-pixels, wherein a length of the second period of the first frame is greater than or equal to two times the unit scanning time.

For example, the method further includes:

turning on a 2kth row of sub-pixels in a first period of the second frame, where k is an integer, 1≤k≤(N−2)/2; and turning on a 2k+2th row of sub-pixels in a second period of the second frame, and applying a 2kth row of data signals to the 2kth row of sub-pixels, wherein a length of the second period of the second frame is greater than or equal to two times the unit scanning time.

For example, the method further includes:

turning on a 2k−1th row of sub-pixels in a first period of the first frame, where k is an integer, 1≤k≤(N−2)/2;

applying a 2k−1th row of data signals to the 2k−1th row of sub-pixels in a second period of the first frame;

turning on a 2k+1th row of sub-pixels in a third period of the first frame, and continuing to apply the 2k−1th row of data signals to the 2k−1th row of sub-pixels; and applying a 2k+1th row of data signals to the 2k−1th row of sub-pixels and the 2k+1th row of sub-pixels in a fourth period of the first frame.

For example, the method further includes:

turning on a 2kth row of sub-pixels in a first period of the second frame, where k is an integer, 1≤k≤(N−2)/2;

applying a 2kth row of data signals to the 2kth row of sub-pixels in a second period of the second frame;

turning on a 2k+2th row of sub-pixels in a third period of the second frame, and continuing to apply the 2kth row of data signals to the 2kth row of sub-pixels; and applying a 2k+2th row of data signals to the 2kth row of sub-pixels and the 2k+2th row of sub-pixels in a fourth period of the second frame.

For example, the method further includes:

turning on a nth row of sub-pixels and a n+1th row of sub-pixels sequentially in a first period of the first frame, where n is an integer, 1≤n≤N−1;

applying a nth row of data signals to the nth row of sub-pixels in a second period of the first frame; and applying a n+1th row of data signals to the n+1th row of sub-pixels in a third period of the first frame, wherein a length of the second period of the first frame is greater than the unit scanning time, a length of the third period of the first frame is less than the unit scanning time, and a sum of the length of the second period of the first frame and the length of the third period of the first frame is greater than or equal to two times the unit scanning time.

For example, the method further includes:

turning on a nth row of sub-pixels and n+1th row of sub-pixels sequentially in a first period of the second frame, where n is an integer, 2≤n≤N−1;

applying a nth row of data signals to the nth row of sub-pixels in a second period of the second frame; and applying a n+1th row of data signals to the n+1th row of sub-pixels in a third period of the second frame, wherein a length of the second period of the second frame is less than the unit scanning time, a length of the third period of the second frame is greater than the unit scanning time, and a sum of the length of the second period of the second frame and the length of the third period of the second frame is greater than or equal to two times the unit scanning time.

For example, the applying, in the first frame, data signals to each odd-numbered row of sub-pixels turned on includes: applying, for M sub-pixels in the each odd-numbered row of sub-pixels turned on, the data signals to a sub-pixel located in a 2a−1th column and a sub-pixel located in a 2ath column, where a is an odd number, 1≤2a−1<M; and the applying, in the second frame, data signals to each even-numbered row of sub-pixels turned on includes: applying, for M sub-pixels in the each even-numbered row of sub-pixels turned on, the data signals to a sub-pixel located in a 2bth column and a sub-pixel located in a 2b+1th column, where b is an even number, 2≤2b≤M.

For example, the applying, in the first frame, data signals to each row of sub-pixels turned on includes: applying, for M sub-pixels in the each odd-numbered row of sub-pixels turned on, the data signals to a sub-pixel located in a 2a−1th column and a sub-pixel located in a 2ath column, where a is an odd number, 1≤2a−1<M; and applying, for M sub-pixels in the each even-numbered row of sub-pixels turned on, the data signals to a sub-pixel located in a 2bth column and a sub-pixel located in a 2b+1th column, where b is an even number, 2≤2b≤M; and the applying, in the second frame, data signals to each row of sub-pixels turned on includes: applying, for M sub-pixels in the each odd-numbered row of sub-pixels turned on, the data signals to a sub-pixel located in a 2bth column and a sub-pixel located in a 2b+1th column, where b is an even number, 2≤2b≤M; and applying, for M sub-pixels in the each even-numbered row of sub-pixels turned on, the data signals to a sub-pixel located in a 2a−1th column and a sub-pixel located in a 2ath column, where a is an odd number, $1 \leq 2a-1 < M$.

For example, the first frame is an odd-numbered frame, and the second frame is an even-numbered frame; or the first frame is an even-numbered frame, and the second frame is an odd-numbered frame.

The embodiments of the present disclosure further provide a display device, including:

a plurality of sub-pixels arranged in an N×M array, where N is an integer greater than 1, and M is an integer greater than 1;

a gate driving circuit connected to the plurality of sub-pixels and configured to scan the plurality of sub-pixels progressively or rows by rows, to turn on each row of sub-pixels scanned, so that a duration in which two adjacent rows of sub-pixels are simultaneously in an ON state is greater than or equal to two times a unit scanning time, wherein the unit scanning time is a time required for scanning a row of sub-pixels; and a source driving circuit connected to the plurality of sub-pixels and configured to apply data signals to at least two rows of sub-pixels simultaneously in the ON state, so that a duration of applying the data signals to each row of sub-pixels is greater than the unit scanning time.

The embodiments of the present disclosure further provide a display device, including:

a plurality of sub-pixels arranged in an N×M array, where N is an integer greater than 1, and M is an integer greater than 1;

a gate driving circuit connected to the plurality of sub-pixels and configured to scan the plurality of sub-pixels progressively or at an interval of at least one row, to turn on each row of sub-pixels scanned, so that a duration in which two rows of sub-pixels sequentially turned on are simultaneously in an ON state is greater than or equal to two times a unit scanning time, wherein the unit scanning time is a time required for scanning a row of sub-pixels; and a source driving circuit connected to the plurality of sub-pixels and configured to apply, in a first frame, data signals sequentially to each row of sub-pixels turned on, so that a duration of applying the data signals to a part of the plurality of sub-pixels is greater than the unit scanning time, and apply, in a second frame, data signals sequentially to each row of sub-pixels turned on, so that a duration of applying the data signals to the other part of the plurality of sub-pixels is greater than the unit scanning time.

DETAILED DESCRIPTION OF EMBODIMENTS

Although the present disclosure will be fully described with reference to the drawings containing the preferred embodiments of the present disclosure, it should be understood that those skilled in the art may modify the present disclosure while obtaining the technical effects of the present disclosure. Therefore, it should be understood that the above description is a broad disclosure for those ordinary skilled in the art, and its content is not intended to limit the exemplary embodiments described in the present disclosure.

In addition, in the following detailed description, for the convenience of explanation, many specific details are set forth to provide a comprehensive understanding of the embodiments of the present disclosure. Obviously, however, one or more embodiments may also be implemented without these specific details. In other cases, well-known structures and devices are shown in diagrammatic form to simplify the drawings.

Figure 1A:
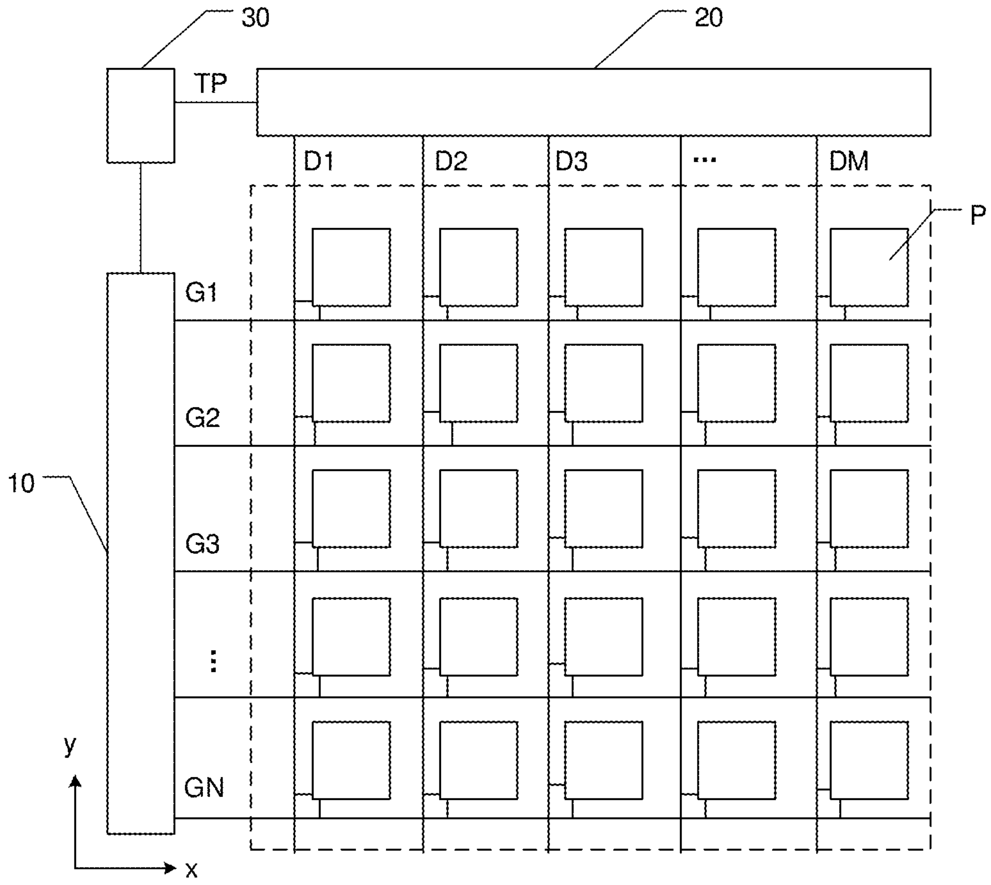
FIG. 1A shows a schematic diagram of a display device according to some embodiments of the present disclosure.

FIG. 1A shows a schematic diagram of a display device according to some embodiments of the present disclosure.

As shown in FIG. 1A, a display device 100 includes a plurality of sub-pixels P arranged in an N×M array, where N is an integer greater than 1, and M is an integer greater than 1.

The display device 100 may further include a gate driving circuit 10 connected to the plurality of sub-pixels P. The gate driving circuit 10 may be connected to N rows of sub-pixels respectively through a plurality of gate signal lines extending in a first direction (x-direction in FIG. 1). For example, the gate driving circuit 10 may be connected to a first row of sub-pixels P through a first gate signal line so as to provide a first gate driving signal G1 to the first row of sub-pixels P, may be connected to a second row of sub-pixels P through a second gate signal line so as to provide a second gate driving signal G2 to the second row of sub-pixels P, and so on. The first row of sub-pixels P are turned on in response to receiving the first gate driving signal G1, the second row of sub-pixels P are turned on in response to receiving the second gate driving signal G2, and so on.

In some embodiments, the gate driving circuit 10 may scan the N rows of sub-pixels P progressively or rows by rows. For example, the gate driving circuit 10 may scan one row of sub-pixels at a time, for example, sequentially generate N gate driving signals G1, G2, . . . GN to sequentially turn on the first row of sub-pixels P, the second row of sub-pixels P, . . . the Nth row of sub-pixels P. The gate driving circuit 10 may also scan two or more rows of sub-pixels P at a time. For example, the gate driving circuit 10 may simultaneously generate a first gate driving signal G1 and a second gate driving signal G2 so as to simultaneously turn on a first row of sub-pixels P and a second row of sub-pixels P, then simultaneously generate a third gate driving signal G3 and a fourth gate driving signal G4 so as to simultaneously turn on a third row of sub-pixels P and a fourth row of sub-pixels P, and so on. In some embodiments, the gate driving circuit 10 may scan the N rows of sub-pixels P at an interval of at least one row so as to sequentially turn on partial rows of sub-pixels P. For example, the gate driving circuit 10 may sequentially turn on odd-numbered rows of sub-pixels P (for example, sequentially turn on a first row of sub-pixels P, a third row of sub-pixels P, a fifth row of sub-pixels P, and so on), or sequentially turn on even-numbered rows of sub-pixels P (for example, sequentially turn on a second row of sub-pixels P, a fourth row of sub-pixels P, a sixth row of sub-pixels P, and so on).

The display device 100 may further include a source driving circuit 20 connected to the plurality of sub-pixels P. For example, the source driving circuit 20 may be connected to M columns of sub-pixels P respectively through a plurality of data lines extending in a second direction (y-direction in FIG. 1). For example, the source driving circuit 20 may be connected to a first column of sub-pixels P through a first data line so as to provide a first data signal D1 to the first column of sub-pixels P, may be connected to a second column of sub-pixels P through a second data line so as to provide a second data signal D2 to the second column of sub-pixels P, and so on.

For example, when the first row of sub-pixels P are turned on, the source driving circuit 20 may provide M data signals D11, D12, . . . , D1M for the first row of sub-pixels, respectively to M sub-pixels P in the first row of sub-pixels P through M data lines; when the second row of sub-pixels P are turned on, the source driving circuit 20 may provide M data signals D21, D22, . . . , D2M for the second row of sub-pixels, respectively to M sub-pixels P in the second row of sub-pixels P through a plurality of data lines, and so on. Certainly, the embodiments of the present disclosure are not limited thereto and will be described in further detail below.

In some embodiments, the display device 100 may further include a timing controller 30. The timing controller 30 is connected to the gate driving circuit 10 and the source driving circuit 20, and may provide respective control signals to the gate driving circuit 10 and the source driving circuit 20. For example, the timing controller 30 may provide a data control signal TP to the source driving circuit 20, and the source driving circuit 20 may output data signals for each row under the control of the data control signal TP. The timing controller 30 may further provide other control signals to the source driving circuit 20, including but not limited to a row data start signal, a data synchronization signal, a data inversion signal, and so on. The timing controller 30 may further provide various control signals to the gate driving circuit 10, including but not limited to a start signal, a clock signal, and so on required by the gate driving circuit 10.

Figure 1B:
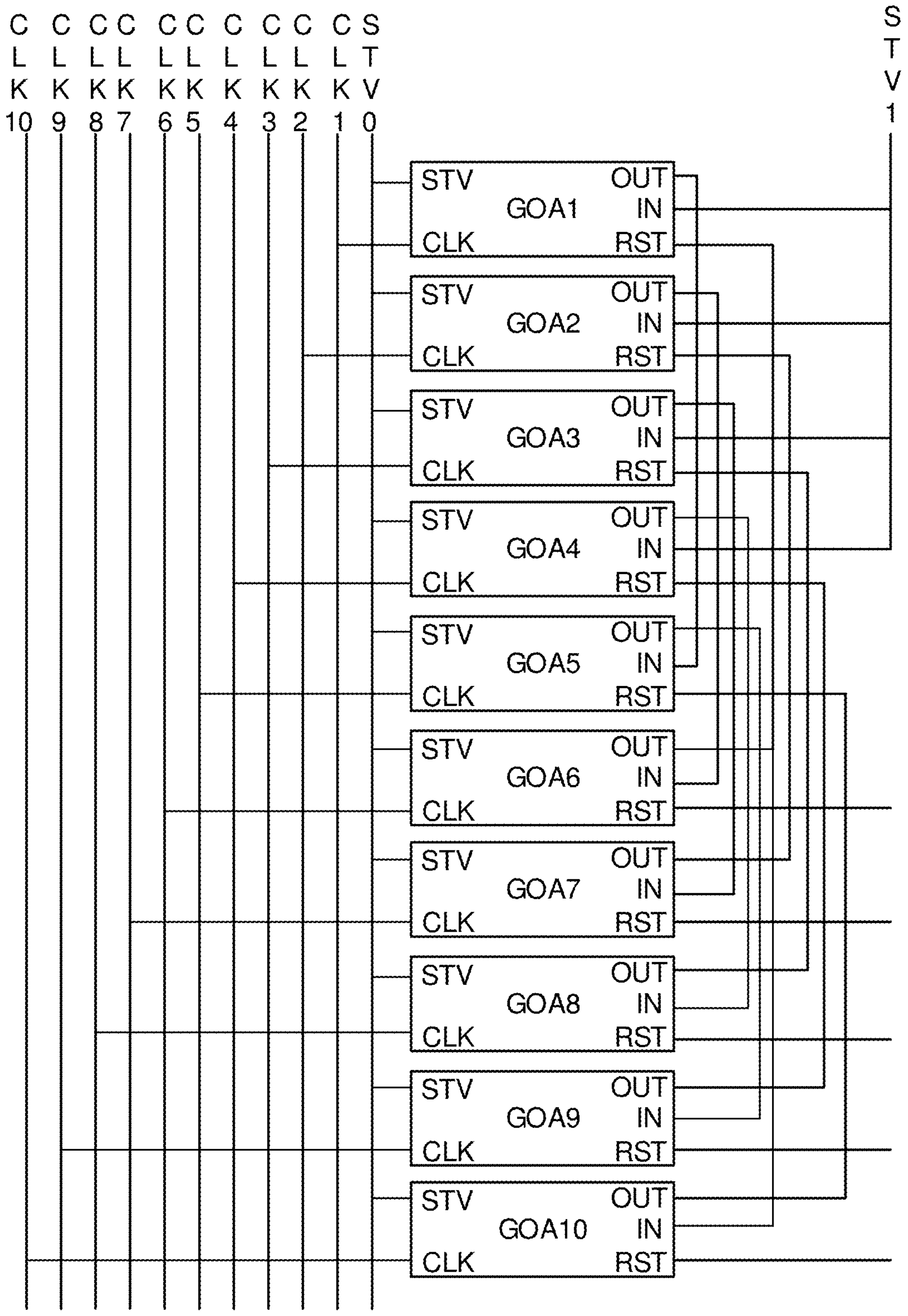
FIG. 1B shows an example structural diagram of a gate driving circuit in the display device of FIG. 1A.

FIG. 1B shows an example structural diagram of the gate driving circuit 10 in the display device of FIG. 1A. As shown in FIG. 1B, the gate driving circuit 10 includes multi-stage cascaded shift register units GOA1, GOA2, . . . , GOAN. For the sake of conciseness, a first stage shift register unit GOA1 to a tenth stage shift register unit GOA10 are shown in FIG. 1B. As shown in FIG. 1B, a nth stage shift register unit GOAn has an input terminal IN connected to an output terminal of a n−4th stage shift register unit GOA (n−4), and a reset terminal RST connected to an output terminal OUT of a n+5th stage shift register unit GOA (n+5), where 5≤n≤N−5. The first stage shift register unit GOA1 to the fourth stage shift register unit GOA4 each have an input terminal IN connected to a start signal terminal STV1. Ten clock signals CLK1 to CLK10 are used in the gate driving circuit 10 of FIG. 1B. A clock signal terminal CLK of the first stage shift register unit GOA1 is connected to receive the first clock signal CLK1, a clock signal terminal CLK of the second stage shift register unit GOA2 is connected to receive the second clock signal CLK2, . . . , and a clock signal terminal CLK of the tenth stage shift register unit GOA10 is connected to receive the tenth clock signal CLK10. In a similar manner, an eleventh stage shift register unit GOA11 to a twentieth stage shift register unit GOA20 are respectively connected to receive the first clock signal CLK1 to the tenth clock signal CLK10. Each stage of shift register units GOA1, GOA2, . . . , GOAN further has a total reset terminal STV connected to receive a total reset signal STV0. The each stage of shift register units GOA1, GOA2, . . . , GOAN may generate an output signal at the output terminal OUT as the gate driving signal, under the control of the signal of the clock signal terminal CLK and the signal of the input terminal IN. For example, the first stage shift register unit GOA1 may generate a first gate driving signal G1, the second stage shift register unit GOA2 may generate a second gate driving signal G2, and so on. By cascading, the gate driving signal generated by one stage of shift register unit may be shifted with respect to the gate driving signal generated by another stage of shift register unit.

The above is only an example of the display device of the embodiments of the present disclosure. The display device of the embodiments of the present disclosure is not limited to have this structure, and may have other structures as required. For example, the display device may be a display device based on liquid crystal display (LCD) technology, or a display device based on organic light emitting diode (OLED) display technology. A cascade mode different from that shown in FIG. 1B may be adopted in the gate driving circuit of the display device. For example, 8 clock signals or 12 clock signals may be cascaded in a different mode.

Figure 2:
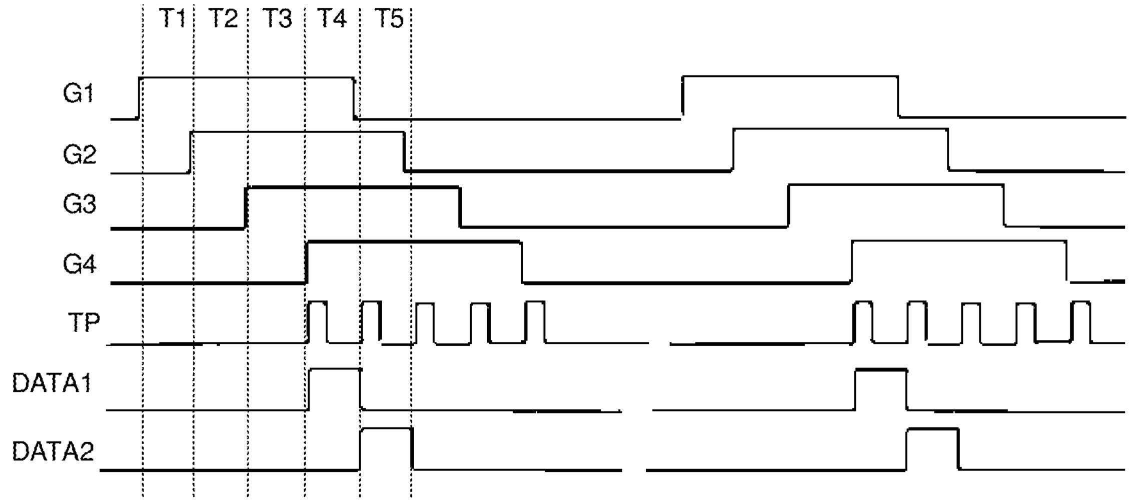
FIG. 2 shows a signal timing diagram of a method of driving display.

FIG. 2 shows a signal timing diagram of a method of driving display. In describing a signal timing in FIG. 2, the display device of FIG. 1A and FIG. 1B is illustrated below by way of example.

As shown in FIG. 2, in each frame, the gate driving circuit 10 may sequentially generate a first gate driving signal G1, a second gate driving signal G2, a third gate driving signal G3 and a fourth gate driving signal G4 at a predetermined time interval, and so on. The time interval is a unit scanning time H, which is a time required for scanning a row of sub-pixels, that is, a time interval from generating a gate driving signal for a row of sub-pixels to generating a gate driving signal for a next row of sub-pixels. In FIG. 2, an effective level duration of each gate driving signal is 4H.

For the first row of sub-pixels, during a period T1 to a period T4, the first gate driving signal G1 is at a high level, so that the first row of sub-pixels are in an ON state. Each of the period T1 to the period T4 has a length of H, so that the first row of sub-pixels are turned on for 4H. In the period T4, a first high-level pulse of the data control signal TP arrives, so as to control the source driving circuit 20 to apply data signals DATA1 for the first row of sub-pixels (also referred to as a first row of data signals) to the first row of sub-pixels in the ON state. The first row of data signals DATA1 may include M data signals D11, D12, . . . , D1M respectively for M sub-pixels in the first row. The data signal D11 is provided to a sub-pixel in the first row and first column, the data signal D12 is provided to a sub-pixel in the first row and second column, . . . , the data signal D1M is provided to a sub-pixel in the first row and Mth column.

Similarly, for the second row of sub-pixels, in a period T2 to a period T5, the second gate driving signal G2 is at a high level, so that the second row of sub-pixels are in the ON state. In the period T5, a second high-level pulse of the data control signal TP arrives, so as to control the source driving circuit 20 to apply data signals DATA2 for the second row of sub-pixels (also referred to as a second row of data signals) to the second row of sub-pixels in the ON state. The second row data signals DATA2 may include M data signals D21, D22, . . . , D2M respectively for M sub-pixels in the second row. The data signal D21 is provided to a sub-pixel in the second row and first column, the data signal D22 is provided to a sub-pixel in the second row and second column, . . . , the data signal D2M is provided to a sub-pixel in the second row and Mth column. The similar also applies to other rows of sub-pixels.

Therefore, although each row of sub-pixels are in the ON state during a period of four times the unit scanning time, a duration of writing the data signals (also referred to as an actual charging time) is equal to the unit scanning time H. For an 8K display device with a resolution of 7680×4320, in a case of a refresh frequency of 60 Hz, the scanning time for one frame is 1/60 second. That is, it takes 1/60 second to scan 4320 rows of sub-pixels, then the time for scanning each row of sub-pixels (that is, the unit scanning time) is $H=1/60\div4320\approx3.7$ us. In a case of a refresh frequency of 120 Hz, the unit scanning time H is 1.85 us, which is too short to allow the sub-pixels to be fully charged, so that the display is affected.

The embodiments of the present disclosure proposes a method of driving display, in which data signals are applied to at least two rows of sub-pixels simultaneously in the ON state, so that a duration of applying the data signals to each row of sub-pixels is greater than the unit scanning time. The method of driving display may be performed by the display device described above. In the following, the method of driving display will be described in detail with reference to FIG. 3 to FIG. 6 in combination with the display device described above with reference to FIG. 1A.

Figure 3:
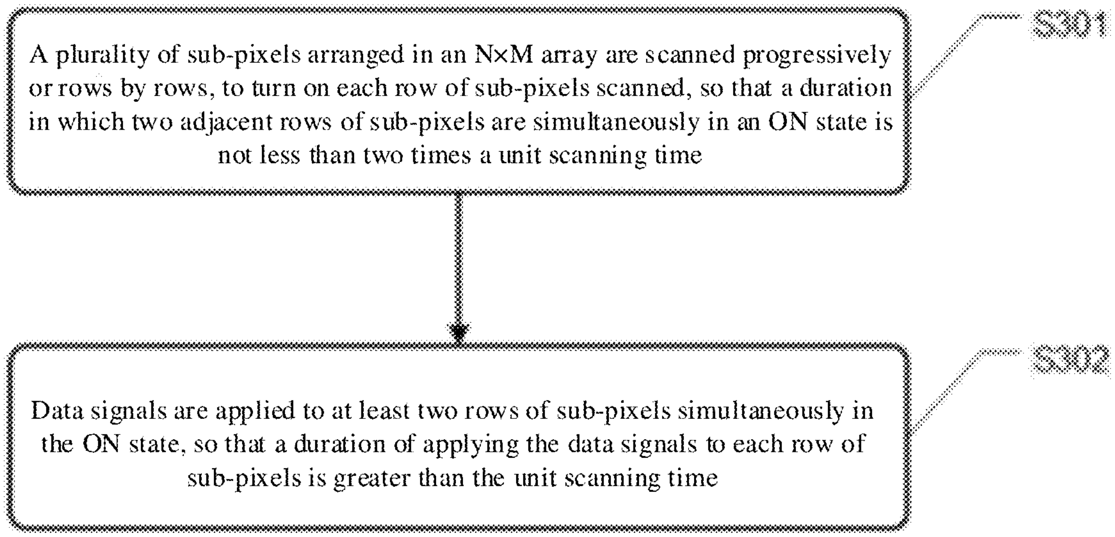
FIG. 3 shows a flowchart of a method of driving display according to some embodiments of the present disclosure.

FIG. 3 shows a flowchart of a method of driving display according to some embodiments of the present disclosure.

In step S301, a plurality of sub-pixels arranged in an N×M array are scanned progressively or rows by rows, to turn on each row of sub-pixels scanned, so that a duration in which two adjacent rows of sub-pixels are simultaneously in an ON state is not less than two times a unit scanning time. The unit scanning time is a time required for scanning a row of sub-pixels. N is an integer greater than 1, and M is an integer greater than 1.

In step S302, data signals are applied to at least two rows of sub-pixels simultaneously in the ON state, so that a duration of applying the data signals to each row of sub-pixels is greater than the unit scanning time.

Figure 4:
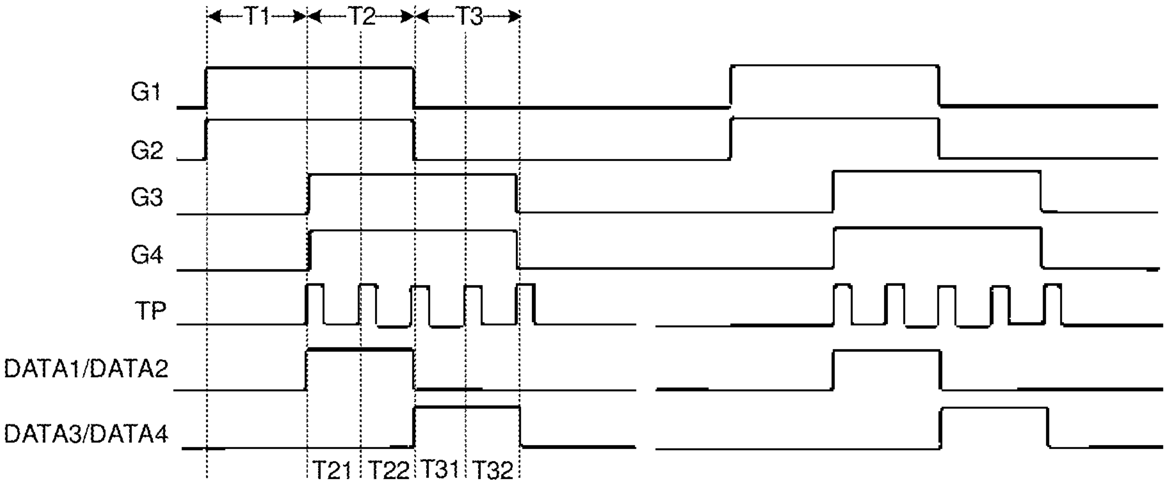
FIG. 4 shows a signal timing diagram of a method of driving display according to an embodiment of the present disclosure.

FIG. 4 shows a signal timing diagram of a method of driving display according to an embodiment of the present disclosure. A detailed description will be given below in combination with the display device in FIG. 1A.

In the period T1 (a first period), the first gate driving signal G1 and the second gate driving signal G2 are at a high level, so that the first row of sub-pixels and the second row of sub-pixels are turned on simultaneously.

In the period T2 (a second period), the third gate driving signal G3 and the fourth gate driving signal G4 are at a high level, so that the third row of sub-pixels and the fourth row of sub-pixels are turned on simultaneously. The first gate driving signal G1 and the second gate driving signal G2 maintains the high level, so that the first row of sub-pixels and the second row of sub-pixels remain in the ON state. The source driving circuit 20 applies data signals to the first row of sub-pixels and the second row of sub-pixels under the control of the data control signal TP.

In FIG. 4, the period T2 includes a first sub-period T21 and a second sub-period T22.

In the first sub-period T21, a first high-level pulse of the data control signal TP arrives, so that the source driving circuit 20 applies the data signals DATA1 for the first row of sub-pixels (also referred to as the first row of data signals) to the first row of sub-pixels and the second row of sub-pixels. The first row of data signals DATA1 may include M data signals D11, D12, . . . , D1M respectively for M sub-pixels in the first row. The data signal D11 may be applied to the sub-pixel in the first row and first column as well as the sub-pixel in the second row and first column, the data signal D12 may be applied to the sub-pixel in the first row and second column as well as the sub-pixel in the second row and second column, and so on.

In the second sub-period T22, a second high-level pulse of the data control signal TP arrives, so that the source driving circuit 20 applies the data signals DATA2 for the second row of sub-pixels (also referred to as the second row of data signals) to the first row of sub-pixels and the second row of sub-pixels. The second row of data signals DATA2 may include M data signals D21, D22, . . . , D2M respectively for M sub-pixels in the second row. The data signal D21 may be applied to the sub-pixel in the first row and first column as well as the sub-pixel in the second row and first column, the data signal D22 may be applied to the sub-pixel in the first row and second column as well as the sub-pixel in the second row and second column, and so on.

Similarly, for the third row of sub-pixels and the fourth row of sub-pixels, in a first period (period T2 in FIG. 4), the third row of sub-pixels and the fourth row of sub-pixels are turned on. In a second period (period T3 in FIG. 4), the fifth row of sub-pixels and the sixth row of sub-pixels are turned on, and the third row of sub-pixels and the fourth row of sub-pixels remain in the ON state. In a first sub-period T31 of the period T3, a third high-level pulse of the data control signal TP arrives, so that the source driving circuit 20 applies a third row of data signals DATA3 to the third row of sub-pixels and the fourth row of sub-pixels. In a second sub-period T32 of the period T3, a fourth high-level pulse of the data control signal TP arrives, so that the source driving circuit 20 applies a fourth row of data signals DATA4 to the third row of sub-pixels and the fourth row of sub-pixels.

In this way, a nth row of sub-pixels and a n+1th row of sub-pixels may be turned on simultaneously in the first period, a nth row of data signals may be applied to the nth row of sub-pixels and the n+1th row of sub-pixels in the first sub-period of the second period, and a n+1th row of data signals may be applied to the nth row of sub-pixels and the n+1th row of sub-pixels in the second sub-period of the second period, where n is an integer, $1 \le n \le N-1$.

For each row of sub-pixels, a length of the second period may be set to be greater than or equal to two times the unit scanning time H, so that the duration of applying the data signals to the each row of sub-pixels is greater than or equal to 2H. For example, as shown in FIG. 4, the period of applying the data signals to the first row of sub-pixels and the second row of sub-pixels is the period T2, the period of applying the data signals to the third row of sub-pixels and the fourth row of sub-pixels is the period T3, and so on. A length of the period T1 and a length of the period T2 each may be set to 2H, and a length of the first sub-period T21 of the period T2 and a length of the second sub-period T22 of the period T2 each may be set to H, so that the actual charging time for the first row of sub-pixels and the second row of sub-pixels reaches 2H. Similarly, the actual charging time for the third row of sub-pixels and the fourth row of sub-pixels may also reach 2H.

Although an application of the data signals is triggered by a rising edge of the pulse of the data control signal TP in the embodiments described above, the embodiments of the present disclosure are not limited thereto. The application of the data signal may also be triggered by using a falling edge of the pulse of the data control signal TP. The same also applies to subsequent embodiments, and will not be repeated here.

In the embodiments of the present disclosure, by applying the data signals to two rows of sub-pixels simultaneously turned on, the actual charging time for each row of sub-pixels may reach 2H or more. By applying two rows of data signals in the two sub-periods of the second period, respectively, complete picture information may be displayed.

Figure 5:
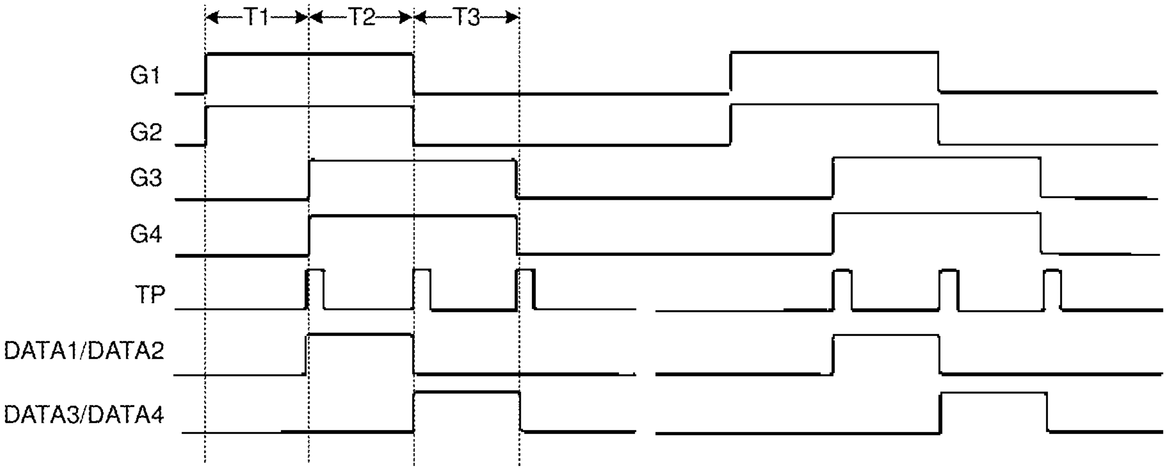
FIG. 5 shows a signal timing diagram of a method of driving display according to another embodiment of the present disclosure.

FIG. 5 shows a signal timing diagram of a method of driving display according to another embodiment of the present disclosure. The method of driving display in FIG. 5 is similar to that in FIG. 4, and a difference lies at least in a mode of applying the data signals in the second period. For the sake of conciseness, the following will mainly describe the difference in detail.

In the period T1 (the first period), similar to FIG. 4, the first row of sub-pixels and the second row of sub-pixels are turned on simultaneously.

In the period T2 (the second period), the third row of sub-pixels and the fourth row of sub-pixels are turned on simultaneously, and the first row of sub-pixels and the second row of sub-pixels remain in the ON state. Different from FIG. 4, one of the first row of data signals DATA1 and the second row of data signals DATA2 are applied to the first row of sub-pixels and the second row of sub-pixels. For example, in the period T2, the first high-level pulse of the data control signal TP arrives, so that the source driving circuit 20 applies the first row of data signals DATA1 to the first row of sub-pixels P and the second row of sub-pixels P simultaneously in the ON state. The first row of data signals DATA1 may include M data signals D11, D12, . . . , D1M respectively for M sub-pixels in the first row. The data signal D11 may be applied to the sub-pixel in the first row and first column as well as the sub-pixel in the second row and first column, the data signal D12 may be applied to the sub-pixel in the first row and second column as well as the sub-pixel in the second row and second column, and so on.

Similarly, for the third row of sub-pixels and the fourth row of sub-pixels, in the first period (period T2 in FIG. 5), the third row of sub-pixels and the fourth row of sub-pixels are turned on. In the next second period (period T3 in FIG. 5), the fifth row of sub-pixels and the sixth row of sub-pixels are turned on, and the third row of sub-pixels and the fourth row of sub-pixels remain in the ON state. The second high-level pulse of the data control signal TP arrives, so that the source driving circuit 20 applies the third row of data signals DATA3 to the third row of sub-pixels and the fourth row of sub-pixels.

In the embodiments described above, the first row of data signals DATA1 are applied to the first row of sub-pixels and the second row of sub-pixels, and the third row of data signals DATA3 are applied to the third row of sub-pixels and the fourth row of sub-pixels. However, the embodiments of the present disclosure are not limited thereto. In some embodiments, the second row of data signals DATA2 may be applied to the first row of sub-pixels and the second row of sub-pixels, and the fourth row of data signals DATA4 may be applied to the third row of sub-pixels and the fourth row of sub-pixels, and so on.

In this way, a nth row of sub-pixels and a n+1th row of sub-pixels may be turned on simultaneously in the first period, and one of a nth row of data signals and a n+1th row of data signals may be applied to the nth row of sub-pixels and the n+1th row of sub-pixels in the second period.

For each row of sub-pixels, a length of the second period may be set to be greater than or equal to two times the unit scanning time H, so that the duration of applying the data signals to the each row of sub-pixels is greater than or equal to 2H. For example, the length of the period T1 and the length of the period T2 each may be equal to 2H, so that the actual charging time for the first row of sub-pixels and the second row of sub-pixels reaches 2H. Similarly, the actual charging time for the third row of sub-pixels and the fourth row of sub-pixels may also reach 2H.

In the embodiments of the present disclosure, by applying the data signals to two rows of sub-pixels simultaneously turned on, the actual charging time for each row of sub-pixels may reach 2H or more, and by applying one row of data signals to two rows of sub-pixels, an amount of data may be reduced.

Figure 6:
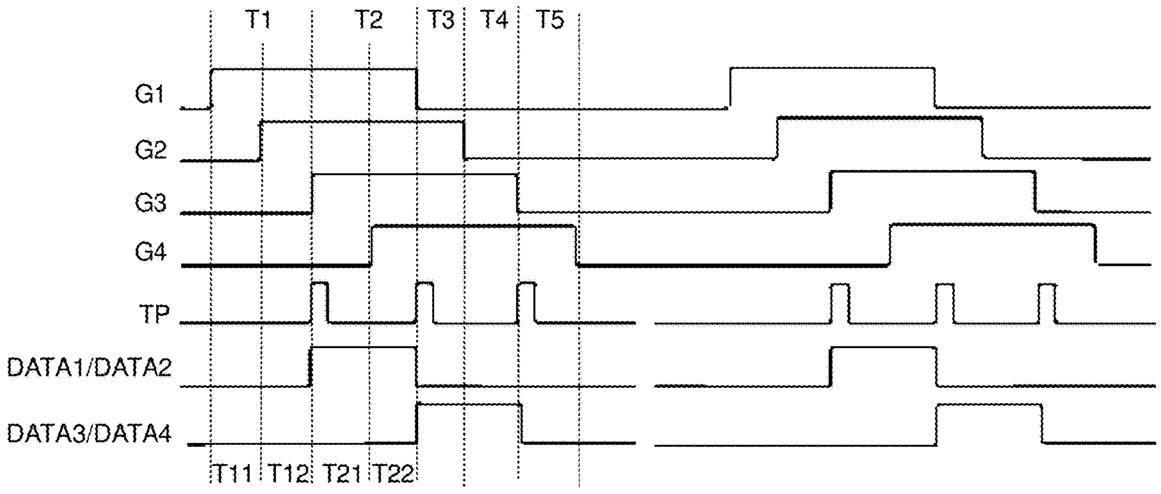
FIG. 6 shows a timing diagram of a method of driving display according to another embodiment of the present disclosure.

FIG. 6 shows a timing diagram of a method of driving display according to another embodiment of the present disclosure.

In the period T1 (the first period), the first row of sub-pixels and the second row of sub-pixels are turned on sequentially. For example, in the first sub-period T11 of the first period T1, the first gate driving signal G1 is at a high level, so as to turn on the first row of sub-pixels. In the second sub-period T12 of the first period T1, the second gate driving signal G2 is at a high level, so as to turn on the second row of sub-pixels.

In the period T2 (the second period), the third row of sub-pixels and the fourth row of sub-pixels are turned on sequentially, and the data signals are applied to the first row of sub-pixels and the second row of sub-pixels. For example, the first high-level pulse of the data control signal TP arrives, so that the source driving circuit 20 applies one of the first row of data signals DATA1 and the second row of data signals DATA2 (in this embodiment, it is the first row of data signals DATA1) to the first row of sub-pixels and the second row of sub-pixels.

In the period T3 (the third period), the first row of sub-pixels are turned off, and the data signals are applied to the second row of sub-pixels, the third row of sub-pixels, and the fourth row of sub-pixels. For example, the second high-level pulse of the data control signal TP arrives, so that one of the third row of data signals DATA3 and the fourth row of data signals DATA4 (in this embodiment, it is the third row of data signals DATA3) are applied to the second row of sub-pixels, the third row of sub-pixels and the fourth row of sub-pixels that are in the ON state.

Similarly, for the third row of sub-pixels and the fourth row of sub-pixels, in the first period (period T2 in FIG. 6), the third row of sub-pixels and the fourth row of sub-pixels are turned on sequentially. For example, in the first sub-period T21 of the second period T2, the third gate driving signal G1 is at a high level, so as to turn on the third row of sub-pixels. In the second sub-period T22 of the period T2, the fourth gate driving signal G2 is at a high level, so as to turn on the fourth row of sub-pixels. In the second period (period T3 and period T4 in FIG. 6), the fifth row of sub-pixels and the sixth row of sub-pixels are turned on sequentially, and one of the third row of data signals DATA3 and the fourth row of data signals DATA4 are applied to the third row of sub-pixels and the fourth row of sub-pixels. In the third period (period T5 in FIG. 6), the third row of sub-pixels are turned off, and one of the fifth row of data signals DATA5 and the sixth row of data signals DATA6 (in this embodiment, it is the fifth row of data signals DATA5) are applied to the fourth row of sub-pixels, the fifth row of sub-pixels and the sixth row of sub-pixels.

In this way, in the first period, the nth row of sub-pixels and the n+1th row of sub-pixels may be turned on sequentially; in the second period, the n+2th row of sub-pixels and the n+3th row of sub-pixels may be turned on sequentially, and one of the nth row of data signals and the n+1th row of data signals may be applied to the nth row of sub-pixels and the n+1th row of sub-pixels; and in the third period, the nth row of sub-pixels may be turned off, and one of the n+2th row of data signals and the n+3th row of data signals may be applied to the n+1th row of sub-pixels, the n+2th row of sub-pixels and the n+3th row of sub-pixels, where n is an integer, $1 \leq n \leq N-3$.

The length of the second period may be set to be greater than or equal to 2H, so that the duration of applying the data signals to the each row of sub-pixels is greater than or equal to 2H. For example, as shown in FIG. 6, the period of applying the data signals to the first row of sub-pixels is the period T2, and the period of applying the data signals to the second row of sub-pixels is the period T2 and the period T3. The length of the period T1 and the length of the period T2 each may be set to 2H, and the length of the period T3 may be set to H. In this case, the actual charging time for the first row of sub-pixels is 2H (the length of the period T2), and the actual charging time for the second row of sub-pixels is 3H (a sum of the length of the period T2 and the length of the period T3). Similarly, the actual charging time for the third row of sub-pixels is 2H, and the actual charging time for the fourth row of sub-pixels is 3H.

In the embodiments of the present disclosure, by turning on two rows of sub-pixels sequentially and applying data signals to two rows of sub-pixels simultaneously in the ON state, the actual charging time for a part of the sub-pixels (for example, odd-numbered rows of sub-pixels) may reach 2H or more, and the actual charging time for the other part of the sub-pixels (for example, even-numbered rows of sub-pixels) may reach 3H or more.

The embodiments of the present disclosure further proposes a method of driving display, in which a part of sub-pixels and the other part of sub-pixels in different frames are driven in different ways, so that the actual charging time for each sub-pixel in at least one frame is greater than the unit scanning time. The method of driving display may be performed by the display device described above. In the following description, the method of driving display will be described in detail with reference to FIG. 7 to FIG. 10C in combination with the display device described above with reference to FIG. 1A.

Figure 7:
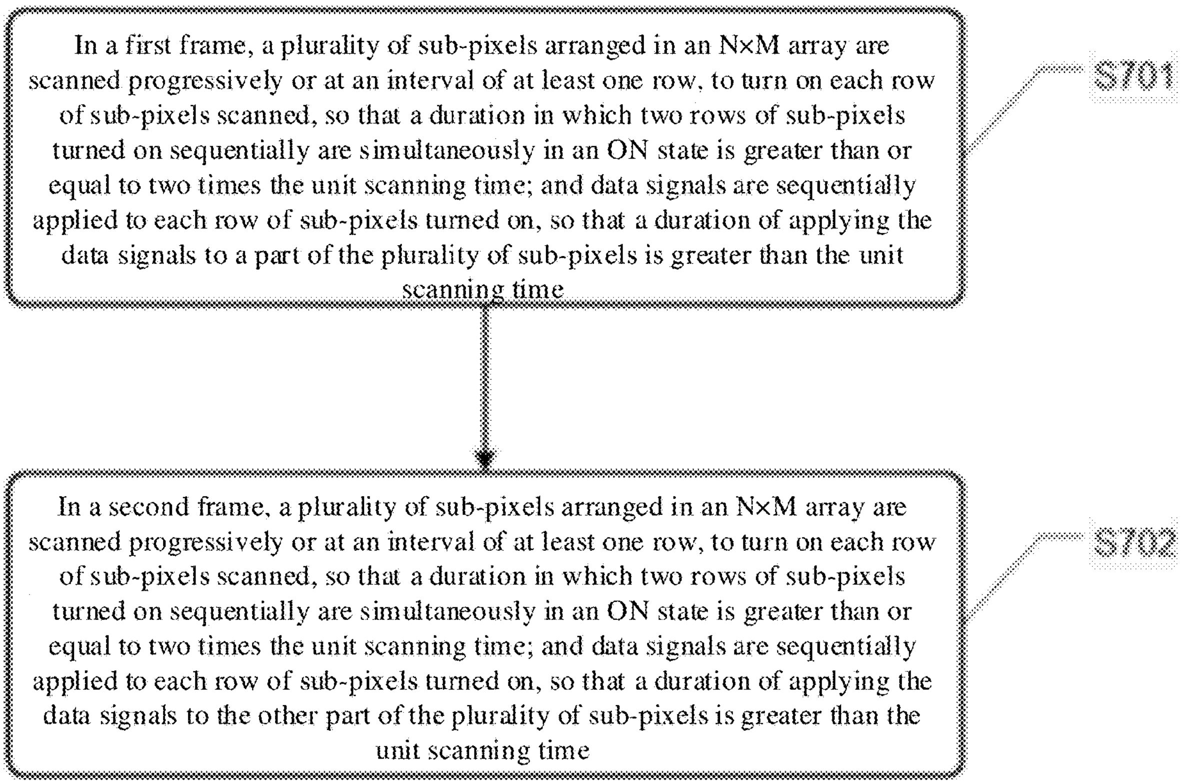
FIG. 7 shows a flowchart of a method of driving display according to another embodiment of the present disclosure.

FIG. 7 shows a flowchart of a method of driving display according to another embodiment of the present disclosure.

In step S701, in a first frame, a plurality of sub-pixels arranged in an N×M array are scanned progressively or at an interval of at least one row, to turn on each row of sub-pixels scanned, so that a duration in which two rows of sub-pixels turned on sequentially are simultaneously in an ON state is greater than or equal to 2H; and data signals are sequentially applied to each row of sub-pixels turned on, so that a duration of applying the data signals to a part of the plurality of sub-pixels is greater than H.

In step S702, in a second frame, a plurality of sub-pixels arranged in an N×M array are scanned progressively or at an interval of at least one row, to turn on each row of sub-pixels scanned, so that a duration in which two rows of sub-pixels turned on sequentially are simultaneously in an ON state is greater than or equal to 2H; and data signals are sequentially applied to each row of sub-pixels turned on, so that a duration of applying the data signals to the other part of the plurality of sub-pixels is greater than H.

In some embodiments, in the first frame, odd-numbered rows of the plurality of sub-pixels may be scanned progressively, and the data signals are applied to each odd-numbered row of sub-pixels turned on, so that a duration of applying the data signals to the each odd-numbered row of sub-pixels is greater than or equal to 2H. In the second frame, even-numbered rows of the plurality of sub-pixels may be scanned progressively, and the data signals are applied to each even-numbered row of sub-pixels turned on, so that a duration of applying the data signals to the each even-numbered row of sub-pixels is greater than or equal to 2H. This will be exemplified below with reference to FIG. 8A to FIG. 9C.

Figure 8A:
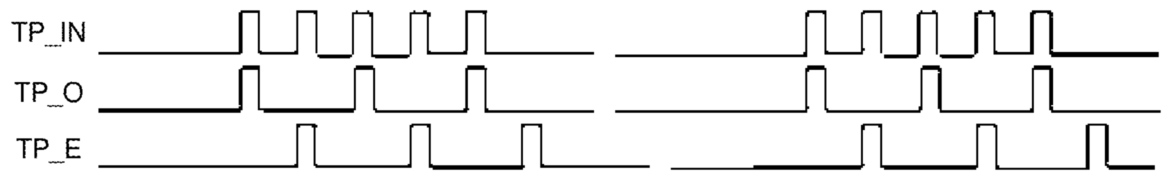
FIG. 8A shows a timing diagram of data control signals in a method of driving display according to another embodiment of the present disclosure.
Figure 8B:
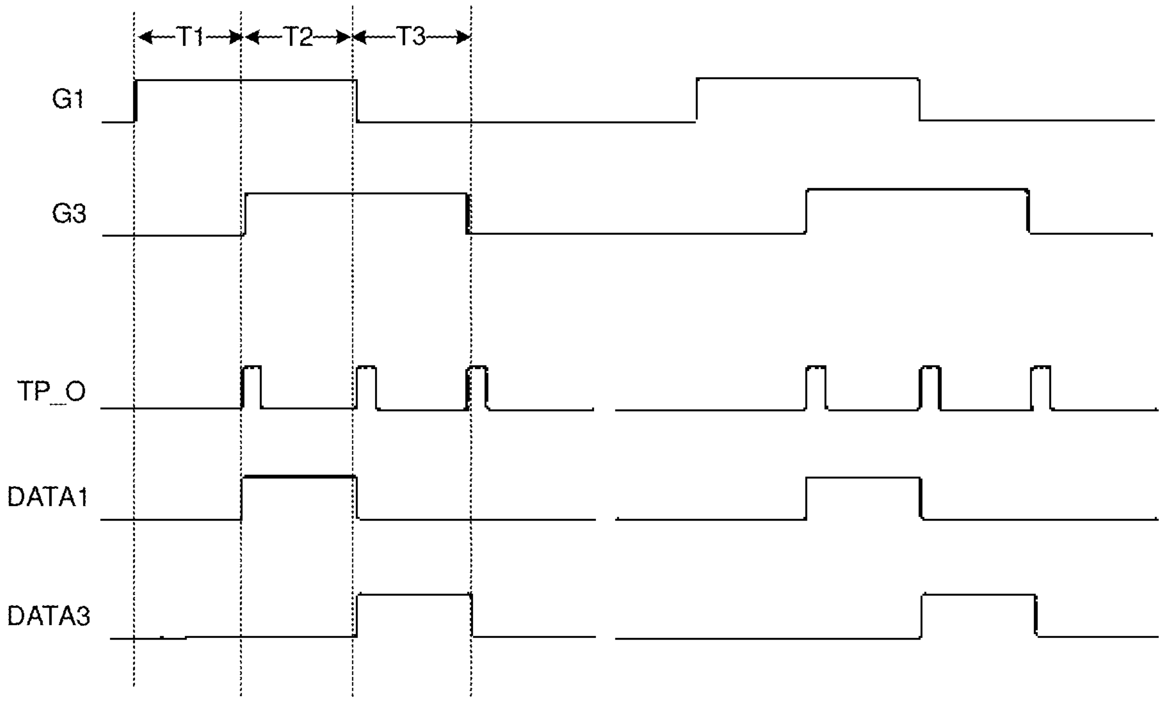
FIG. 8B shows a signal timing diagram of a method of driving display in an odd-numbered frame according to another embodiment of the present disclosure.
Figure 8C:
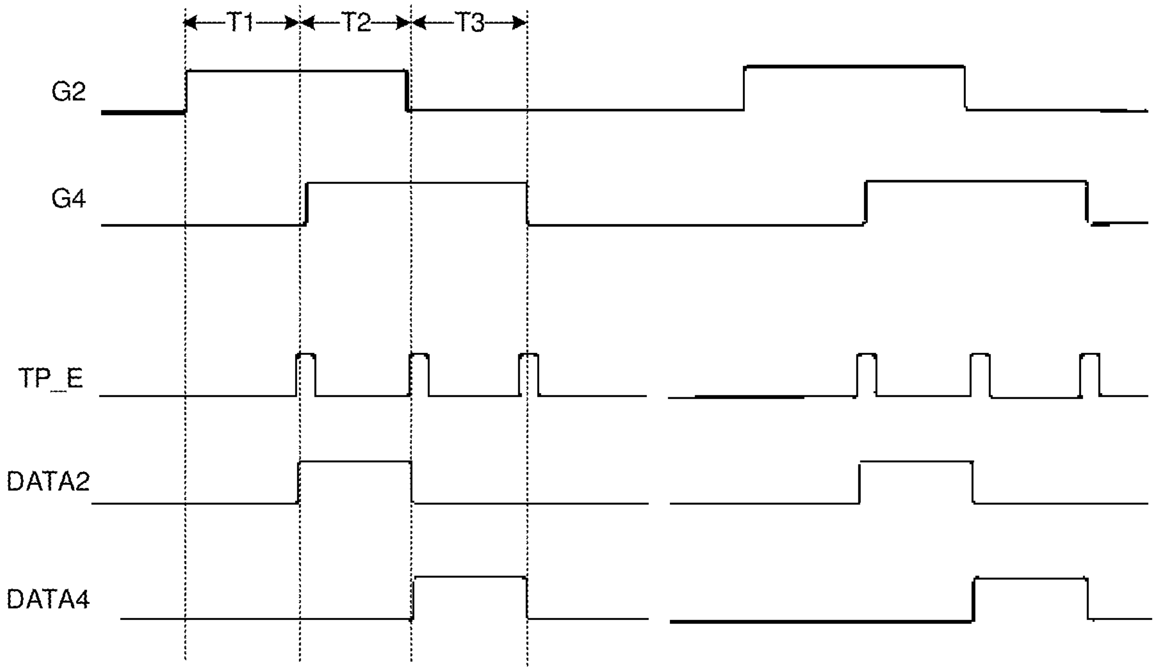
FIG. 8C shows a signal timing diagram of a method of driving display in an even-numbered frame according to another embodiment of the present disclosure.

FIG. 8A shows a timing diagram of data control signals in a method of driving display according to another embodiment of the present disclosure. FIG. 8B shows a signal timing diagram of a method of driving display in an odd-numbered frame according to another embodiment of the present disclosure. FIG. 8C shows a signal timing diagram of a method of driving display in an even-numbered frame according to another embodiment of the present disclosure.

As shown in FIG. 8A, a data control signal for an odd-numbered frame (also referred to as an odd-numbered frame data control signal) TP_O and a data control signal for an even-numbered frame (also referred to as an even-numbered frame data control signal) TP_E may be generated based on an initial data control signal TP_IN. A signal period of the odd-numbered frame data control signal TP_O and a signal period of the even-numbered frame data control signal TP_E each may be two times that of the initial data control signal TP_IN. A duty cycle of the odd-numbered frame data control signal TP_O and a duty cycle of the even-numbered frame data control signal TP_E each may be one-half of that of the initial data control signal TP_IN. The even-numbered frame data control signal TP_E may be shifted with respect to the odd-numbered frame data control signal TP_O, for example, by a half period. The odd-numbered frame data control signal TP_O may be used to control the application of the data signals in the odd-numbered frame, and the even-numbered frame data control signal TP_E may be used to control the application of the data signals in the even-numbered frame.

As shown in FIG. 8B, in an odd-numbered frame, odd-numbered rows of the plurality of sub-pixels may be scanned progressively, and the data signal may be applied to each odd-numbered row of sub-pixels turned on, under the control of the odd-numbered frame data control signal TP_O.

In the period T1 (the first period), the first gate driving signal G1 is at a high level, so as to turn on the first row of sub-pixels.

In the period T2 (the second period), the third gate driving signal G3 is at a high level, so as to turn on the third row of sub-pixels. The first high-level pulse of the odd-numbered frame data control signal TP_O arrives, so that the first row of data signals DATA1 are applied to the first row of sub-pixels.

Similarly, for the third row of sub-pixels and the fifth row of sub-pixels, in the first period (the period T2 in FIG. 8B), the third row of sub-pixels are turned on; in the second period (the period T3 in FIG. 8B), the fifth row of sub-pixels are turned on, and the second high-level pulse of the odd-numbered frame data control signal TP_O arrives, so that the third row of data signals DATA3 are applied to the third row of sub-pixels.

In this way, in the odd-numbered frame, a 2k−1th row of sub-pixels are turned on in the first period; and in the second period, a 2k+1th row of sub-pixels are turned on, and a 2k−1th row of data signals are applied to the 2k−1th row of sub-pixels, where k is an integer, $1 \le k \le (N-2)/2$.

The length of the second period may be set to be greater than or equal to 2H, so that the actual charging time for each odd-numbered row of sub-pixels is greater than or equal to 2H. For example, in the embodiment of FIG. 8B, the period of applying the data signals to the first row of sub-pixels is the period T2, the period for applying the data signals to the third row of sub-pixels is the period T3, and so on. Each of the length of the period T1, the length of the period T2, the length of the period T3 . . . may be set to be equal to 2H, so that the actual charging time for each odd-numbered row of sub-pixels is 2H.

As shown in FIG. 8C, in an even-numbered frame, even-numbered rows of the plurality of sub-pixels may be scanned progressively, and the data signals may be applied to each even-numbered row of sub-pixels turned on, under the control of the even-numbered frame data control signal TP_E.

In the period T1 (the first period), the second gate driving signal G2 is at a high level, so as to turn on the second row of sub-pixels.

In the period T2 (the second period), the fourth gate driving signal G4 is at a high level, so as to turn on the fourth row of sub-pixels. The first high-level pulse of the even-numbered frame data control signal TP_E arrives, so that the second row of data signals DATA2 are applied to the second row of sub-pixels.

Similarly, for the fourth row of sub-pixels and the sixth row of sub-pixels, in the first period (the period T2 in FIG. 8B), the fourth row of sub-pixels are turned on. In the second period (the period T3 in FIG. 8B), the sixth row of sub-pixels are turned on, and the second high-level pulse of the even-numbered frame data control signal TP_E arrives, so that the fourth row of data signals DATA4 are applied to the fourth row of sub-pixels.

In this way, in the even-numbered frame, a 2kth row of sub-pixels are turned on in the first period; and in the second period, a 2k+2th row of sub-pixels are turned on, and a 2k+2th row of data signals are applied to the 2k+2th row of sub-pixels.

The length of the second period may be set to be greater than or equal to 2H, so that the actual charging time for each even-numbered row of sub-pixels is greater than or equal to 2H. For example, in the embodiment of FIG. 8C, the period of applying the data signals to the second row of sub-pixels is the period T2, the period of applying the data signals to the fourth row of sub-pixels is the period T3, and so on. Each of the length of the period T1, the length of the period T2, the length of the period T3 . . . may be set to be equal to 2H, so that the actual charging time for each even-numbered row of sub-pixels is 2H.

Figure 9A:
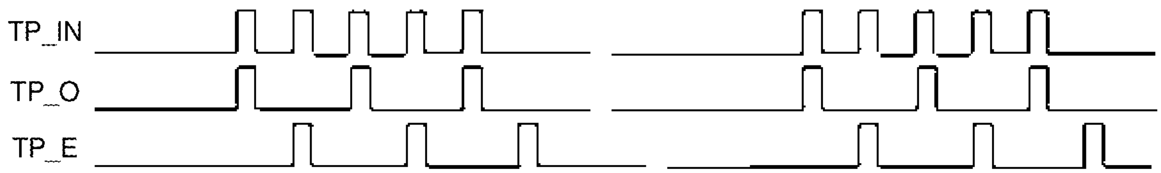
FIG. 9A shows a timing diagram of data control signals in a method of driving display according to another embodiment of the present disclosure.
Figure 9B:
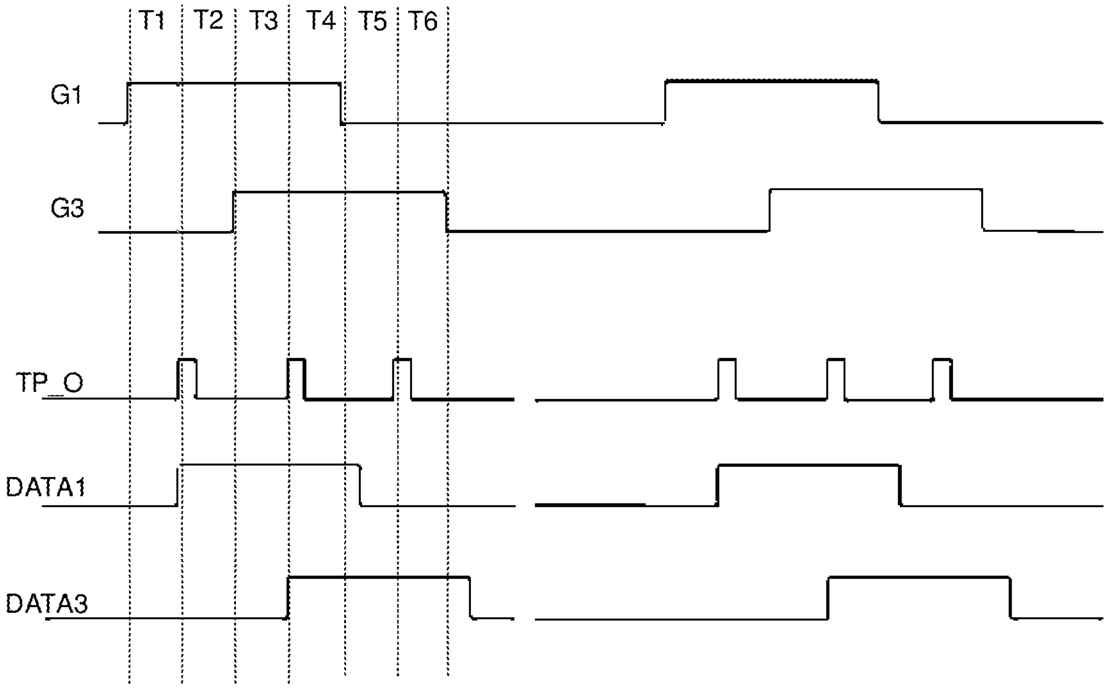
FIG. 9B shows a signal timing diagram of a method of driving display in an odd-numbered frame according to another embodiment of the present disclosure.
Figure 9C:
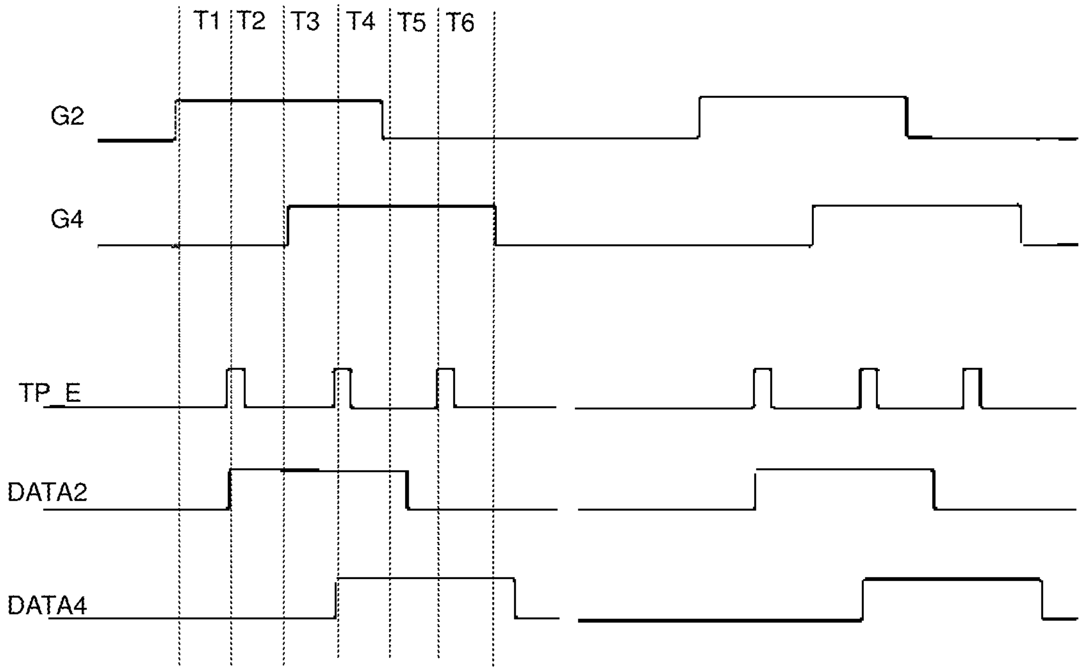
FIG. 9C shows a signal timing diagram of a method of driving display in an even-numbered frame according to another embodiment of the present disclosure.

FIG. 9A shows a timing diagram of data control signals in a method of driving display according to another embodiment of the present disclosure. FIG. 9B shows a signal timing diagram of a method of driving display in an odd-numbered frame according to another embodiment of the present disclosure. FIG. 9C shows a signal timing diagram of a method of driving display in an even-numbered frame according to another embodiment of the present disclosure. The method of driving display in FIG. 9A to FIG. 9C is similar to that in FIG. 8A to FIG. 8C, and a difference lies at least in that the duration of applying the data signals to each row of sub-pixels is longer. For the sake of conciseness, the following will mainly describe the difference in detail.

As shown in FIG. 9A, similar to FIG. 8A, the odd-numbered frame data control signal TP_O and the even-numbered frame data control signal TP-E may be generated based on the initial data control signal TP_IN.

As shown in FIG. 9B, in an odd-numbered frame, odd-numbered rows of the plurality of sub-pixels may be scanned progressively, and the data signals may be applied to each odd-numbered row of sub-pixels turned on, under the control of the odd-numbered frame data control signal TP_O.

In the period T1 (the first period), the first gate driving signal G1 is at a high level, so as to turn on the first row of sub-pixels.

In the period T2 (the second period), the first gate driving signal G1 is still at a high level, so that the first row of sub-pixels remain in the ON state. The first high-level pulse of the odd-numbered frame data control signal TP_O arrives, so that the first row of data signals DATA1 are applied to the first row of sub-pixels.

In the period T3 (the third period), the first gate driving signal G1 is still at a high level, so that the first row of sub-pixels remain in the ON state. The third gate driving signal G3 is at a high level, so that the third row of sub-pixels are turned on, and the first row of data signals DATA1 are continuously applied to the first row of sub-pixels.

In the period T4 (the fourth period), the first gate driving signal G1 and the third gate driving signal G3 are still at a high level, so that the first row of sub-pixels and the third row of sub-pixels remain in the ON state. The second high-level pulse of the odd-numbered frame data control signal TP_O arrives, so that the third row of data signals DATA3 are applied to the first row of sub-pixels and the third row of sub-pixels.

Similarly, for the third row of sub-pixels and the fifth row of sub-pixels, in the first period (the period T3 in FIG. 9B), the third row of sub-pixels are turned on. In the second period (the period T4 in FIG. 9B), the second high-level pulse of the odd-numbered frame data control signal TP_O arrives, so that the third row of data signals DATA3 are applied to the third row of sub-pixels. In the third period (the period T5 in FIG. 9B), the fifth row of sub-pixels are turned on, and the third row of data signals DATA3 are continuously applied to the third row of sub-pixels. In the fourth period (the period T6 in FIG. 9B), the third high-level pulse of the odd-numbered frame data control signal TP_O arrives, so that the fifth row of data signals DATA5 are applied to the third row of sub-pixels and the fifth row of sub-pixels.

In this way, in the odd-numbered frame, the 2k−1 row of sub-pixels are turned on in the first period, where k is an integer. The 2k−1 row of data signals are applied to the 2k−1 row of sub-pixels in the second period. In the third period, the 2k+1 row of sub-pixels are turned on, and the 2k−1 row of data signals are continuously applied to the 2k−1 row of sub-pixels. In the fourth period, the 2k+1 row of data signals are applied to the 2k−1th row of sub-pixels and the 2k+1 row of sub-pixels, where k is an integer, $1 \le k \le (N-2)/2$.

As shown in FIG. 8C, in an even-numbered frame, even-numbered rows of the plurality of sub-pixels may be scanned progressively, and the data signals may be applied to each even-numbered row of sub-pixels turned on, under the control of the even-numbered frame data control signal TP_E.

In the period T1 (the first period), the second gate driving signal G2 is at a high level, so as to turn on the second row of sub-pixels.

In the period T2 (the second period), the second gate driving signal G2 is still at a high level, so that the second row of sub-pixels remain in the ON state. The first high-level pulse of the even-numbered frame data control signal TP_E arrives, so that the second row of data signals DATA2 are applied to the second row of sub-pixels.

In the period T3 (the third period), the second gate driving signal G2 is still at a high level, so that the second row of sub-pixels remain in the ON state. The fourth gate driving signal G4 is at a high level, so that the fourth row of sub-pixels are turned on, and the second row of data signals DATA2 are continuously applied to the second row of sub-pixels.

In the period T4 (the fourth period), the second gate driving signal G2 and the fourth gate driving signal G4 are still at a high level, so that the second row of sub-pixels and the fourth row of sub-pixels remain in the ON state. The second high-level pulse of the even-numbered frame data control signal TP_E arrives, so that the fourth row of data signals DATA4 are applied to the second row of sub-pixels and the fourth row of sub-pixels.

Similarly, for the fourth row of sub-pixels and the sixth row of sub-pixels, in the first period (the period T3 in FIG. 9C), the fourth row of sub-pixels are turned on. In the second period (the period T4 in FIG. 9C), the second high-level pulse of the even-numbered frame data control signal TP_E arrives, so that the fourth row of data signals DATA4 are applied to the fourth row of sub-pixels. In the third period (the period T5 in FIG. 9C), the sixth row of sub-pixels are turned on, and the fourth row of data signals DATA4 are continuously applied to the fourth row of sub-pixels. In the fourth period (the period T6 in FIG. 9C), the third high-level pulse of the even-numbered frame data control signal TP_E arrives, so that the sixth row of data signals DATA6 are applied to the fourth row of sub-pixels and the sixth row of sub-pixels.

In this way, in the even-numbered frame, the 2k row of sub-pixels may be turned on in the first period. In the second period, the 2k row of data signals are applied to the 2k row of sub-pixels. In the third period, the 2k+2 row of sub-pixels are turned on, and the 2k row of data signals are continuously applied to the 2k row of sub-pixels. In the fourth period, the 2k+2 row of data signals are applied to the 2kth row of sub-pixels and the 2k+2 row of sub-pixels, where k is an integer, $1 \le k \le (N-2)/2$.

In other embodiments, in the first frame, the plurality of sub-pixels may be scanned progressively, and the data signals may be applied to each row of sub-pixels turned on, so that a duration of applying the data signals to each odd-numbered row of sub-pixels is greater than the unit scanning time, and a duration of applying the data signals to each even-numbered row of sub-pixels is less than the unit scanning time. In the second frame, the plurality of sub-pixels may be scanned progressively, and the data signals may be applied to each row of sub-pixels turned on, so that a duration of applying the data signals to each even-numbered row of sub-pixels is greater than the unit scanning time, and a duration of applying the data signals to each odd-numbered row of sub-pixels is less than the unit scanning time. This will be exemplified below in detail with reference to FIG. 10A to FIG. 10C.

Figure 10A:
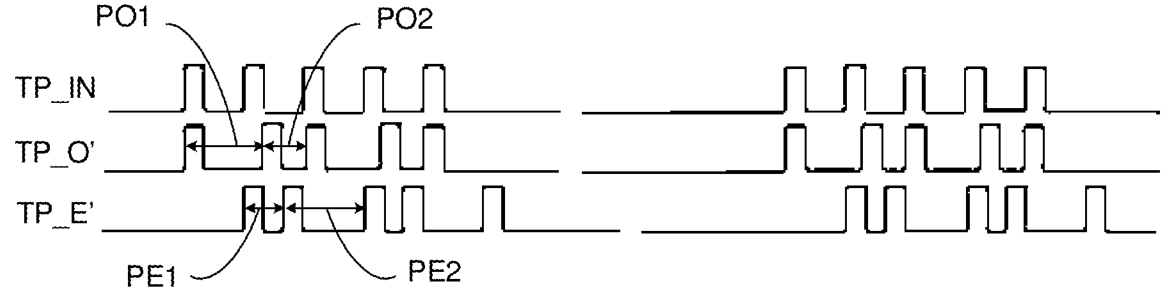
FIG. 10A shows a timing diagram of data control signals in a method of driving display according to another embodiment of the present disclosure.
Figure 10B:
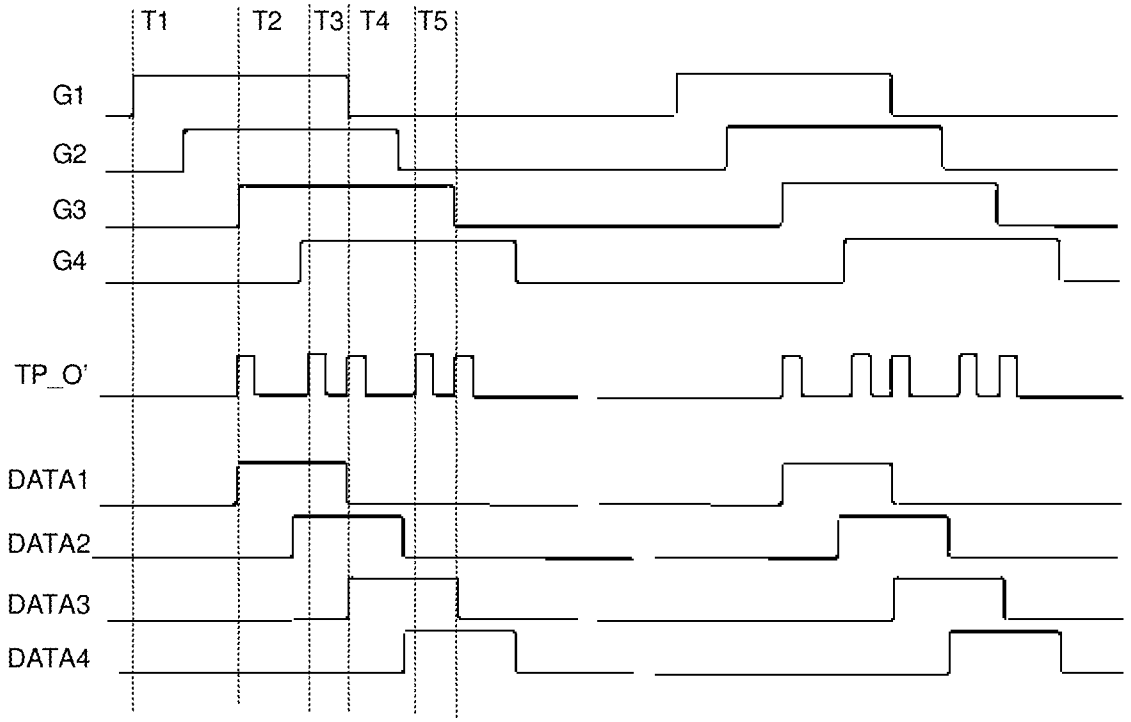
FIG. 10B shows a signal timing diagram of a method of driving display in an odd-numbered frame according to another embodiment of the present disclosure.
Figure 10C:
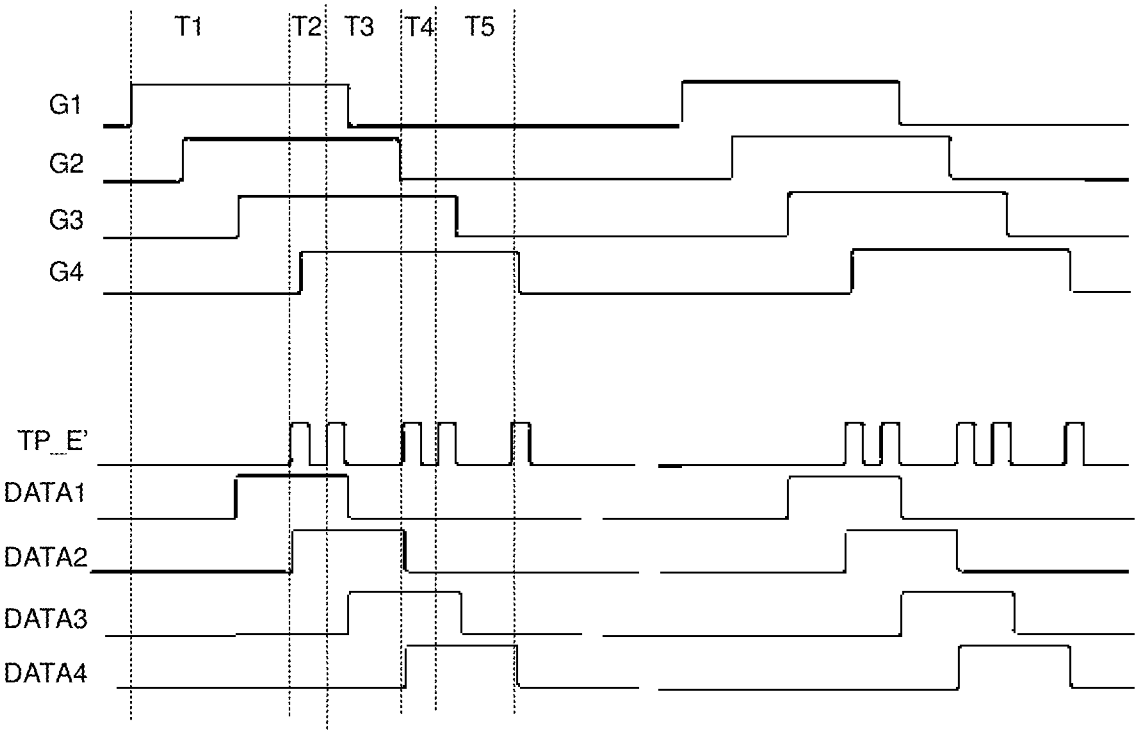
FIG. 10C shows a signal timing diagram of a method of driving display in an even-numbered frame according to another embodiment of the present disclosure.

FIG. 10A shows a timing diagram of data control signals in a method of driving display according to another embodiment of the present disclosure. FIG. 10B shows a signal timing diagram of a method of driving display in an odd-numbered frame according to another embodiment of the present disclosure. FIG. 10C shows a signal timing diagram of a method of driving display in an even-numbered frame according to another embodiment of the present disclosure.

As shown in FIG. 10A, a data control signal for an odd-numbered frame (also referred to as an odd-numbered frame data control signal) TP_O' and a data control signal for an even-numbered frame (also referred to as an even-numbered frame data control signal) TP_E' may be generated based on the initial data control signal TP_IN. The odd-numbered frame data control signal TP_O' may be used to control the application of the data signals in the odd-numbered frame, and the even-numbered frame data control signal TP_E' may be used to control the application of the data signals in the even-numbered frame.

In FIG. 10A, a signal period of the odd-numbered frame data control signal TP_O' and a signal period of the even-numbered frame data control signal TP_E' may be two times that of the initial data control signal TP_IN. The signal period of the odd-numbered frame data control signal TP_O' includes a first sub-part PO1 and a second sub-part PO2. A duty cycle of the first sub-part PO1 is smaller than that of the initial data control signal TP_IN, and a duty cycle of the second sub-part PO2 is greater than that of the initial data control signal TP_IN. The signal period of the even-numbered frame data control signal TP_E' includes a first sub-part PE1 and a second sub-part PE2. A duty cycle of the first sub-part PE1 is smaller than that of the initial data control signal TP_IN, and a duty cycle of the second sub-part PE2 is greater than that of the initial data control signal TP_IN. The even-numbered frame data control signal TP_E' may be shifted with respect to the odd-numbered frame data control signal TP_O'.

As shown in FIG. 10B, in an odd-numbered frame, each row of sub-pixels may be turned on progressively, and the data signals may be applied to each row of sub-pixels turned on, under the control of the odd-numbered frame data control signal TP_O'.

In the period T1, the first row of sub-pixels and the second row of sub-pixels are turned on sequentially. For example, in the first sub-period of the period T1, the first gate driving signal G1 is at a high level, so as to turn on the first row of sub-pixels. In the second sub-period of the period T1, the second gate driving signal G2 is at a high level, so as to turn on the second row of sub-pixels.

In the period T2, the first high-level pulse of the odd-numbered frame data control signal TP_O' arrives, so that the first row of data signals DATA1 are applied to the first row of sub-pixels.

In the period T3, the second high-level pulse of the odd-numbered frame data control signal TP_O' arrives, so that the second row of data signals DATA2 are applied to the second row of sub-pixels.

Similarly, for the third row of sub-pixels and the fourth row of sub-pixels, in the first period (the period T2 and the period T3 in FIG. 10B), the third row of sub-pixels and the fourth row of sub-pixels are turned on sequentially. In the second period (the period T4 in FIG. 10B), the third row of data signals DATA3 are applied to the third row of sub-pixels. In the third period (the period T5 in FIG. 10B), the fourth row of data signals DATA4 are applied to the fourth row of sub-pixels.

In this way, in the odd-numbered frame, the nth row of sub-pixels and the n+1th row of sub-pixels may be turned on sequentially in the first period, the nth row of data signals may be applied to the nth row of sub-pixels in the second period, and the n+1th row of data signals may be applied to the n+1th row of sub-pixels in the third period, where n is an integer, $1 \le n \le N-1$.

In the odd-numbered frame, the length of the second period may be greater than H, the length of the third period may be less than H, and the sum of the length of the second period and the length of the third period may be greater than or equal to 2H. In this way, in the odd-numbered frame, the actual charging time for each odd-numbered row of sub-pixels is greater than H, and the actual charging time for each even-numbered row of sub-pixels is less than H.

For example, in FIG. 10B, the time interval of turning on each row of sub-pixels may be H, the turning-on duration of each row of sub-pixels may be 4H, the length of the period T1 is 2H, and the sum of the length of the period T2 and the length of the period T3 is 2H. The length of the period T2 is greater than H, and the length of the period T3 is less than H. Since the period of applying the data signals to the first row of sub-pixels is the period T2, and the period of applying the data signals to the second row of sub-pixels is the period T3, the actual charging time for the first row of sub-pixels (that is, the length of the period T2) may be greater than H, and the actual charging time for the second row of sub-pixels (the length of the period T3) is less than H. Similarly, for the third row of sub-pixels and the fourth row of sub-pixels, the actual charging time for the third row of sub-pixels (the length of the period T4) may be greater than H, and the actual charging time for the fourth row of sub-pixels (the length of the period T5) may be less than H.

As shown in FIG. 10C, in the even-numbered frame, each row of sub-pixels may be turned on progressively, and the data signals may be applied to each row of sub-pixels turned on, under the control of the even-numbered frame data control signal TP_E'. The signal timing in FIG. 10C is similar to that in FIG. 10B, and the difference lies at least in the length of the period T2 and the length of the period T3. For the sake of conciseness, the following will mainly describe the difference in detail.

In the period T1, the first gate driving signal G1 to the third gate driving signal G3 sequentially change to a high level, so as to sequentially turn on the first row of sub-pixels and the second row of sub-pixels.

In the period T2, the first high-level pulse of the even-numbered frame data control signal TP_E' arrives, so that the first row of data signals are applied to the first row of sub-pixels.

In the period T3, the second high-level pulse of the even-numbered frame data control signal TP_E' arrives, so that the second row of data signals DATA2 are applied to the second row of sub-pixels.

Similarly, for the third row of sub-pixels and the fourth row of sub-pixels, in the first period (from the time when the third gate driving signal G3 changes to a high level to a start time of the period T4 in FIG. 10C), the third row of sub-pixels and the fourth row of sub-pixels are turned on sequentially. In the second period (the period T4 in FIG. 10C), the third high-level pulse of the even-numbered frame data control signal TP_E' arrives, so that the third row of data signals DATA3 are applied to the third row of sub-pixels. In the third period (the period T5 in FIG. 10C), the fourth high-level pulse of the even-numbered frame data control signal TP_E' arrives, so that the fourth row of data signals DATA4 are applied to the fourth row of sub-pixels.

In the even-numbered frame, the length of the second period may be less than H, the length of the third period may be greater than H, and the sum of the length of the second period and the length of the third period may be greater than or equal to 2H. In this way, in the even-numbered frame, the actual charging time for each odd-numbered row of sub-pixels is less than H, and the actual charging time for each even-numbered row of sub-pixels is greater than H.

For example, in FIG. 10C, the time interval of turning on each row of sub-pixels may be H, the turning-on duration of each row of sub-pixels may be 4H, the length of the period T1 is 2H, and the sum of the length of the period T2 and the length of the period T3 is 2H. The length of the period T2 is greater than H, and the length of the period T3 is less than H. Since the period of applying the data signals to the first row of sub-pixels is the period T2, and the period of applying the data signals to the second row of sub-pixels is the period T3, the actual charging time for the first row of sub-pixels (that is, the length of the period T2) may be less than H, and the actual charging time for the second row of sub-pixels (the length of the period T3) may be greater than H. Similarly, for the third row of sub-pixels and the fourth row of sub-pixels, the actual charging time for the third row of sub-pixels (the length of the period T4) may be less than H, and the actual charging time for the fourth row of sub-pixels (the length of the period T5) may be greater than H.

According to the embodiments of the present disclosure, in the odd-numbered frame, the actual charging time for the odd-numbered row of sub-pixels is greater than the actual charging time for the even-numbered row of sub-pixels, and in the even-numbered frame, the actual charging time for the even-numbered row of sub-pixels is greater than the actual charging time for the odd-numbered row of sub-pixels, so that the actual charging time for each row of sub-pixels is greater than H in one of the two frames. Compared with a case in the traditional technology in that the actual charging time for the sub-pixels is H in each frame, the actual charging time for at least partial sub-pixels is extended in at least partial frames.

In some embodiments, the data signals may also be applied at an interval of a plurality of columns of sub-pixels, so as to reduce the amount of data required for displaying a picture. A detailed description will be given below with reference to FIG. 11A to FIG. 12B.

Figure 11A:
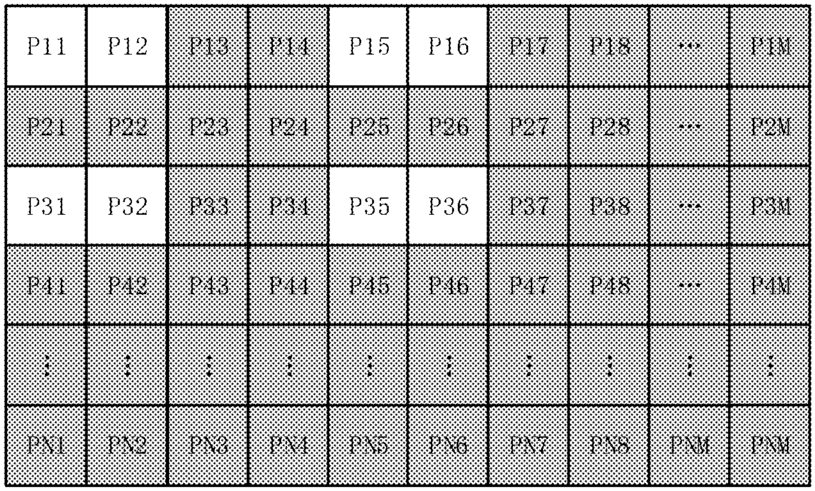
FIG. 11A shows a schematic diagram of a method of applying data signals to each row of sub-pixels turned on in an odd-numbered frame according to an embodiment of the present disclosure.
Figure 11B:
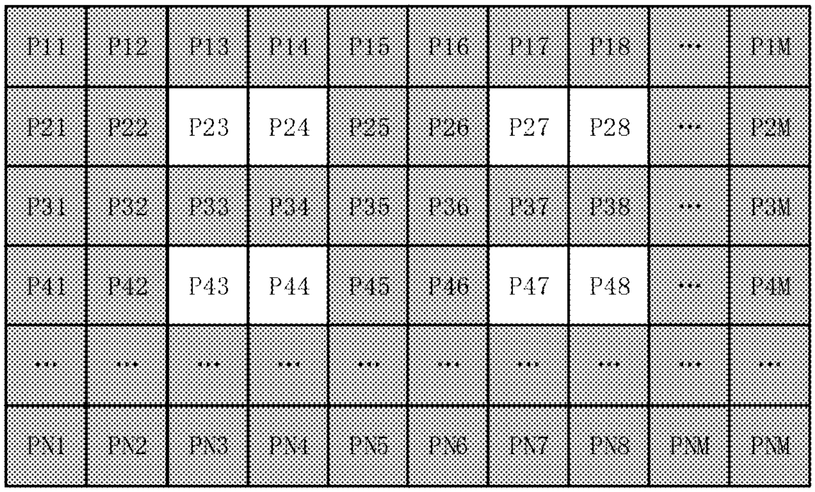
FIG. 11B shows a schematic diagram of a method of applying data signals to each row of sub-pixels turned on in an even-numbered frame according to an embodiment of the present disclosure.

FIG. 11A shows a schematic diagram of a method of applying data signals to each row of sub-pixels turned on in an odd-numbered frame according to an embodiment of the present disclosure. FIG. 11B shows a schematic diagram of a method of applying data signals to each row of sub-pixels turned on in an even-numbered frame according to an embodiment of the present disclosure. FIG. 11A and FIG. 11B will be described below in combination with the method of driving display described above with reference to FIG. 8A to FIG. 8C.

In the odd-numbered frame, according to the signal timing in FIG. 8B, the first row of sub-pixels, the third row of sub-pixels, the fifth row of sub-pixels . . . are turned on sequentially, and the data signals are applied to each row of sub-pixels turned on.

As shown in FIG. 11A, during the ON state of the M sub-pixels P11, P12, . . . , P1M in the first row, the data signals may be applied to the sub-pixel located in the 2a−1th column and the sub-pixel located in the 2ath column, where a is an odd number, 1≤2a−1<M. For example, in FIG. 11A, the data signals are applied to the sub-pixel located in the first row and first column, the sub-pixel located in the first row and second column, the sub-pixel located in the first row and fifth column, the sub-pixel located in the first row and sixth column . . . (that is, sub-pixels P11, P12, P15, P16 . . . ), so as to make them display (as shown in white boxes in FIG. 11A). For example, the data signal D11 may be applied to the sub-pixel P11, the data signal D12 may be applied to the sub-pixel P12, the data signal D15 may be applied to the sub-pixel P15, the data signal D16 may be applied to the sub-pixel P16, and so on.

In a similar manner, during the ON state of the M sub-pixels P31, P32, . . . , P3M in the third row, the data signals may be applied to the sub-pixels P31, P32, P35, P36 . . . so as to make them display (as shown in the white boxes in FIG. 11A). Similarly, for M sub-pixels in the each odd-numbered row of sub-pixels turned on, the data signals are applied to the sub-pixel located in the 2a−1th column and the sub-pixel located in the 2ath column.

For sub-pixels other than the above-mentioned sub-pixels applied with the data signals, data signals applied to the other sub-pixels may be set to a default value (for example, 0V) or may be calculated based on an existing data signal. For example, the data signal D13 for the sub-pixel P13 and the data signal D14 for the sub-pixel P14 may be calculated based on the data signals D11, D12, D15 and D16, and so on.

In the even-numbered frame, according to the signal timing in FIG. 8B, the second row of sub-pixels, the fourth row of sub-pixels, the sixth row of sub-pixels . . . are turned on sequentially, and the data signals are applied to each row of sub-pixels turned on.

As shown in FIG. 11B, during the ON state of the M sub-pixels P21, P22, . . . , P2M in the second row, the data signals may be applied to the sub-pixel located in the 2b−1th column and the sub-pixel located in the 2bth column, where a is an even number, 2≤2b≤M. For example, in FIG. 11B, the data signals are applied to the sub-pixels P23, P24, P27, P28 . . . , so as to make them display (as shown in the white boxes in FIG. 11B). For example, the data signal D23 may be applied to the sub-pixel P23, the data signal D24 may be applied to the sub-pixel P24, the data signal D27 may be applied to the sub-pixel P27, the data signal D28 may be applied to the sub-pixel P28, and so on.

In a similar manner, during the ON state of the M sub-pixels P41, P42, . . . , P4M in the fourth row, the data signals may be applied to the sub-pixels P43, P44, P47, P48 . . . so as to make them display (as shown in the white boxes in FIG. 11B). Similarly, for M sub-pixels in the each even-numbered row of sub-pixels turned on, the data signals are applied to the sub-pixel located in the 2bth column and the sub-pixel located in the 2b+1th column.

Similarly, for sub-pixels other than the above-mentioned sub-pixels applied with the data signals, data signals applied to the other sub-pixels may be set to a default value (for example, 0V) or may be calculated based on an existing data signal. For example, the data signal D25 for the sub-pixel P25 and the data signal D26 for the sub-pixel P26 may be calculated based on the data signals D23, D24, D27 and D28, and so on.

Figure 12A:
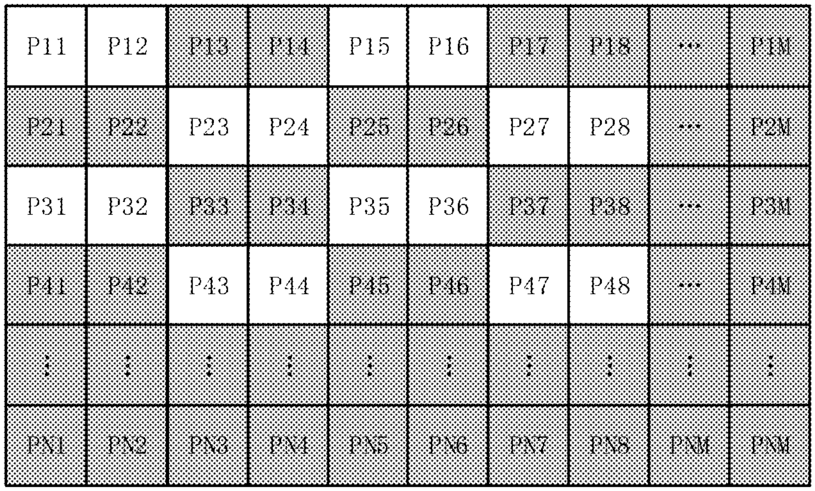
FIG. 12A shows a schematic diagram of a method of applying data signals to each row of sub-pixels turned on in an odd-numbered frame according to another embodiment of the present disclosure.
Figure 12B:
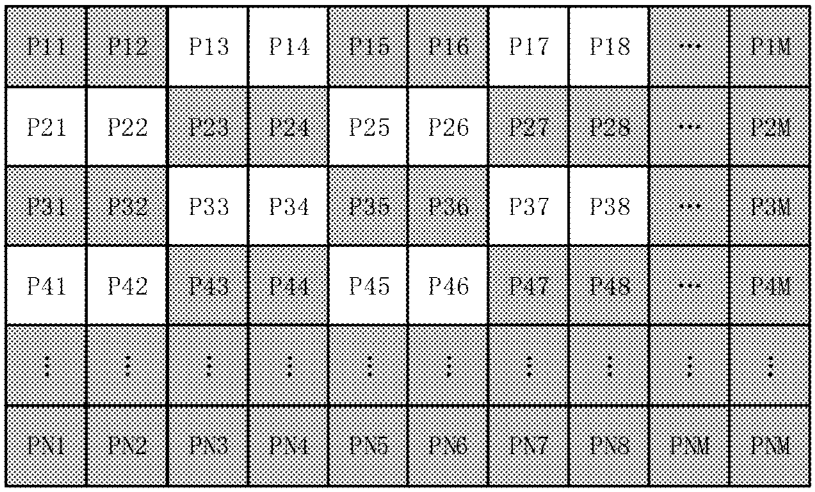
FIG. 12B shows a schematic diagram of a method of applying data signals to each row of sub-pixels turned on in an even-numbered frame according to another embodiment of the present disclosure.

FIG. 12A shows a schematic diagram of a method of applying data signals to each row of sub-pixels turned on in an odd-numbered frame according to another embodiment of the present disclosure. FIG. 12B shows a schematic diagram of a method of applying data signals to each row of sub-pixels turned on in an even-numbered frame according to another embodiment of the present disclosure. FIG. 12A and FIG. 12B will be described below in combination with the method of driving display described above with reference to FIG. 10A to FIG. 10C.

In the odd-numbered frame, according to the signal timing in FIG. 10B, the first row of sub-pixels, the second row of sub-pixels, the third row of sub-pixels, . . . are turned on sequentially, and the data signals are applied to each row of sub-pixels turned on.

As shown in FIG. 12A, during the ON state of the M sub-pixels P11, P12, . . . , P1M in the first row, the data signals may be applied to the sub-pixel located in the 2a−1th column and the sub-pixel located in the 2ath column, where a is an odd number, 1≤2a−1<M. For example, in FIG. 12A, the data signals D11, D12, D15, D16 . . . are applied respectively to the sub-pixels P11, P12, P15, P16 . . . , so as to make them display (as shown in the white boxes in FIG. 12A).

During the ON state of the M sub-pixels P21, P22, . . . , P2M in the second row, the data signals may be applied to the sub-pixel located in the 2bth column and the sub-pixel located in the 2b+1th column, where b is an even number, 2≤2b≤M. For example, in FIG. 12A, the data signals D23, D24, D27, D28 . . . are applied respectively to the sub-pixels P23, P24, P27, P28 . . . , so as to make them display (as shown in the white boxes in FIG. 12A).

During the ON state of the M sub-pixels P31, P32, . . . , P3M in the third row, the data signals D31, D32, D35, D36 . . . may be applied respectively to the sub-pixels P31, P32, P35, P36 . . . , so as to make them display (as shown in the white boxes in FIG. 12A).

During the ON state of the M sub-pixels P41, P42, . . . , P4M in the fourth row, the data signals D43, D44, D47, D48 . . . may be applied to the sub-pixels P43, P44, P47, P48 . . . to make them display (as shown in the white boxes in FIG. 12A).

Similarly, for M sub-pixels in the each odd-numbered row of sub-pixels turned on, the data signals are applied to the sub-pixel located in the 2a−1th column and the sub-pixel located in the 2ath column, and for M sub-pixels in the each even-numbered row of sub-pixels turned on, the data signals are applied to the sub-pixel located in the 2bth column and the sub-pixel located in the 2b+1th column.

In the even-numbered frame, according to the signal timing in FIG. 10C, the first row of sub-pixels, the second row of sub-pixels, the third row of sub-pixels . . . are turned on sequentially, and the data signals are applied to each row of sub-pixels turned on.

As shown in FIG. 12B, during the ON state of the M sub-pixels P11, P12, . . . , P1M in the first row, the data signals may be applied to the sub-pixel located in the 2bth column and the sub-pixel located in the 2b+1th column. For example, in FIG. 12A, the data signals D13, D14, D17, D18 . . . are applied respectively to the sub-pixels P13, P14, P17, P18 . . . , so as to make them display (as shown in the white boxes in FIG. 12B).

During the ON state of the M sub-pixels P21, P22, . . . , P2M in the second row, the data signals may be applied to the sub-pixel located in the 2a−1th column and the sub-pixel located in the 2ath column. For example, in FIG. 12B, the data signals D21, D22, D25, D26 . . . are applied to the sub-pixels P21, P22, P25, P26 . . . , so as to make them display (as shown in the white boxes in FIG. 12A).

During the ON state of the M sub-pixels P31, P32, . . . , P3M in the third row, the data signals D33, D34, D37, D38 . . . may be applied to the sub-pixels P33, P34, P37, P38 . . . so as to make them display (as shown in the white boxes in FIG. 12B).

During the ON state of the M sub-pixels P41, P42, . . . , P4M in the fourth row, the data signals D41, D42, D45, D46 . . . may be applied to the sub-pixels P41, P42, P45, P46 . . . so as to make them display (as shown in the white boxes in FIG. 12B).

Similarly, for the M sub-pixels in the each odd-numbered row of sub-pixels turned on, the data signals may be applied to the sub-pixel located in the 2bth column and the sub-pixel located in the 2b+1th column, and for the M sub-pixels in the each even-numbered row of sub-pixels turned on, the data signals may be applied to the sub-pixel located in the 2a−1th column and the sub-pixel located in the 2ath column.

For sub-pixels other than the above-mentioned sub-pixels applied with the data signals, data signal applied to the other sub-pixels may be set to a default value (for example, 0V) or may be calculated based on an existing data signal. For example, for the odd-numbered frame, the data signal D13 for the sub-pixel P13 and the data signal D14 for the sub-pixel P14 may be calculated based on the data signals D11, D12, D15 and D16, and for the even-numbered frame, the data signal D15 for the sub-pixel P15 and the data signal D16 for the sub-pixel P16 may be calculated based on the data signals D13, D14, D17 and D18, and so on, which will not be repeated here.

Although the data signal application manners in FIG. 11A to FIG. 12B are described above in combination with FIG. 8A to FIG. 8C and FIG. 10A to FIG. 10C, the embodiments of the present disclosure are not limited thereto. In the method of driving display of any embodiment described above, the above method of applying the data signals at an interval of a plurality of columns of sub-pixels may be used to reduce the amount of data.

Although the "odd-numbered frame" and the "even-numbered frame" are illustrated in the above embodiments by way of example in describing the method of driving display of the embodiments of the present disclosure, the embodiments of the present disclosure are not limited thereto. The "odd-numbered frame" and the "even-numbered frame" may be used interchangeably. In some embodiments, the "odd-numbered frame" and the "even-numbered frame" may also be replaced with "one frame" and "another frame", as long as they are different frames.

The embodiments of the present disclosure further provide a display device, such as the display device 100 described above with reference to FIG. 1A and FIG. 1B. The method of driving display of any of the embodiments described above may be performed in the display device. For example, the display device 100 includes a plurality of sub-pixels P arranged in an N×M array, and a gate driving circuit 10 and a source driving circuit 20 that are connected to the plurality of sub-pixels P.

In some embodiments, the gate driving circuit 10 may scan the plurality of sub-pixels P progressively or rows by rows, to turn on each row of sub-pixels P scanned, so that a duration in which two adjacent rows of sub-pixels P are simultaneously in the ON state is greater than two times the unit scanning time. The source driving circuit 20 may apply data signals to at least two rows of sub-pixels simultaneously in the ON state, so that a duration of applying the data signals to each row of sub-pixels is greater than the unit scanning time.

In other embodiments, the gate driving circuit 10 may scan the plurality of sub-pixels P progressively or at an interval of at least one row, to turn on each row of sub-pixels P scanned, so that a duration in which two adjacent rows of sub-pixels P turned on sequentially are simultaneously in the ON state is greater than two times the unit scanning time. The source driving circuit 20 may apply, in a first frame, data signals sequentially to each row of sub-pixels P turned on, so that a duration of applying the data signals to a part of the plurality of sub-pixels P is greater than the unit scanning time, and apply, in a second frame, data signals sequentially to each row of sub-pixels P turned on, so that a duration of applying the data signals to the other part of the plurality of sub-pixels P is greater than the unit scanning time.

Those skilled in the art may understand that the embodiments described above are exemplary, and those skilled in the art may make improvements. The structures described in the various embodiments may be combined freely without conflicts in structure or principle.

After describing the preferred embodiments of the present disclosure in detail, those skilled in the art may clearly understand that various changes and modifications may be made without departing from the scope and spirit of the appended claims, and the present disclosure is not limited to implementations of the exemplary embodiments described in the present disclosure.

What is claimed is:

1. A method of driving display, comprising:

in a first frame, scanning progressively or at an interval of at least one row, a plurality of sub-pixels arranged in an N×M array by using gate driving signals, to turn on each row of sub-pixels scanned, so that a duration in which two rows of sub-pixels turned on sequentially are simultaneously in an ON state is greater than or equal to two times a unit scanning time; and applying data signals to each row of sub-pixels turned on, so that a duration of applying the data signals to a part of the plurality of sub-pixels is greater than the unit scanning time, wherein the unit scanning time is a time required for scanning a row of sub-pixels, N is an integer greater than 1, and M is an integer greater than 1; and in a second frame, scanning progressively or at an interval of at least one row, a plurality of sub-pixels arranged in an N×M array by using gate driving signals, to turn on each row of sub-pixels scanned, so that a duration in which two rows of sub-pixels turned on sequentially are simultaneously in an ON state is greater than or equal to two times the unit scanning time; and applying data signals to each row of sub-pixels turned on, so that a duration of applying the data signals to the other part of the plurality of sub-pixels is greater than the unit scanning time, wherein a duration of an effective level of the gate driving signals is smaller than a duration of a non-effective level of the gate driving signals.

2. The method of claim 1, further comprising:

in the first frame, scanning odd-numbered rows of the plurality of sub-pixels progressively, to turn on each odd-numbered row of sub-pixels scanned, so that a duration in which two adjacent odd-numbered rows of sub-pixels are simultaneously in an ON state is greater than or equal to two times the unit scanning time; and applying data signals to each odd-numbered row of sub-pixels turned on, so that a duration of applying the data signals to the each odd-numbered row of sub-pixels is greater than or equal to two times the unit scanning time; and in the second frame, scanning even-numbered rows of the plurality of sub-pixels progressively, to turn on each even-numbered row of sub-pixels scanned, so that a duration in which two adjacent even-numbered rows of sub-pixels are simultaneously in an ON state is greater than or equal to two times the unit scanning time; and applying data signals to each even-numbered row of sub-pixels turned on, so that a duration of applying the data signals to the each even-numbered row of sub-pixels is greater than or equal to two times the unit scanning time.

3. The method of claim 2, further comprising:

turning on a 2k−1th row of sub-pixels in a first period of the first frame, where k is an integer, 1≤k≤(N−2)/2; and turning on a 2k+1th row of sub-pixels in a second period of the first frame, and applying a 2k−1th row of data signals to the 2k−1th row of sub-pixels, wherein a length of the second period of the first frame is greater than or equal to two times the unit scanning time.

4. The method of claim 2, further comprising:

turning on a 2kth row of sub-pixels in a first period of the second frame, where k is an integer, 1≤k≤(N−2)/2; and turning on a 2k+2th row of sub-pixels in a second period of the second frame, and applying a 2kth row of data signals to the 2kth row of sub-pixels, wherein a length of the second period of the second frame is greater than or equal to two times the unit scanning time.

5. The method of claim 2, further comprising:

turning on a 2k−1th row of sub-pixels in a first period of the first frame, where k is an integer, 1≤k≤(N−2)/2;

applying a 2k−1th row of data signals to the 2k−1th row of sub-pixels in a second period of the first frame;

turning on a 2k+1th row of sub-pixels in a third period of the first frame, and continuing to apply the 2k−1th row of data signals to the 2k−1th row of sub-pixels; and applying a 2k+1th row of data signals to the 2k−1th row of sub-pixels and the 2k+1th row of sub-pixels in a fourth period of the first frame.

6. The method of claim 2, further comprising:

turning on a 2kth row of sub-pixels in a first period of the second frame, where k is an integer, 1≤k≤(N−2)/2;

applying a 2kth row of data signals to the 2kth row of sub-pixels in a second period of the second frame;

turning on a 2k+2th row of sub-pixels in a third period of the second frame, and continuing to apply the 2kth row of data signals to the 2kth row of sub-pixels; and applying a 2k+2th row of data signals to the 2kth row of sub-pixels and the 2k+2th row of sub-pixels in a fourth period of the second frame.

7. The method of claim 2, wherein:

the applying, in the first frame, data signals to each odd-numbered row of sub-pixels turned on comprises: applying, for M sub-pixels in the each odd-numbered row of sub-pixels turned on, the data signals to a sub-pixel located in a 2a−1th column and a sub-pixel located in a 2ath column, where a is an odd number, 1≤2a−1<M; and the applying, in the second frame, data signals to each even-numbered row of sub-pixels turned on comprises: applying, for M sub-pixels in the each even-numbered row of sub-pixels turned on, the data signals to a sub-pixel located in a 2bth column and a sub-pixel located in a 2b+1th column, where b is an even number, 2≤2b≤M.

8. The method of claim 1, further comprising:

in the first frame, scanning the plurality of sub-pixels progressively to turn on each row of sub-pixels scanned, so that a duration in which two adjacent rows of sub-pixels are simultaneously in an ON state is greater than two times the unit scanning time; and applying data signals to each row of sub-pixels turned on, so that a duration of applying the data signals to each odd-numbered row of sub-pixels is greater than the unit scanning time, and a duration of applying the data signals to each even-numbered row of sub-pixels is less than the unit scanning time; and in the second frame, scanning the plurality of sub-pixels progressively to turn on each row of sub-pixels scanned, so that a duration in which two adjacent rows of sub-pixels are simultaneously in an ON state is greater than two times the unit scanning time; and applying data signals to each row of sub-pixels turned on, so that a duration of applying the data signals to each even-numbered row of sub-pixels is greater than the unit scanning time, and a duration of applying the data signals to each odd-numbered row of sub-pixels is less than the unit scanning time.

9. The method of claim 8, further comprising:

turning on a nth row of sub-pixels and a n+1th row of sub-pixels sequentially in a first period of the first frame, where n is an integer, 1≤n≤N−1;

applying a nth row of data signals to the nth row of sub-pixels in a second period of the first frame; and applying a n+1th row of data signals to the n+1th row of sub-pixels in a third period of the first frame, wherein a length of the second period of the first frame is greater than the unit scanning time, a length of the third period of the first frame is less than the unit scanning time, and a sum of the length of the second period of the first frame and the length of the third period of the first frame is greater than or equal to two times the unit scanning time.

10. The method of claim 8, further comprising:

turning on a nth row of sub-pixels and a n+1th row of sub-pixels sequentially in a first period of the second frame, where n is an integer, 2≤n≤N−1;

applying a nth row of data signals to the nth row of sub-pixels in a second period of the second frame; and applying a n+1th row of data signals to the n+1th row of sub-pixels in a third period of the second frame, wherein a length of the second period of the second frame is less than the unit scanning time, a length of the third period of the second frame is greater than the unit scanning time, and a sum of the length of the second period of the second frame and the length of the third period of the second frame is greater than or equal to two times the unit scanning time.

11. The method of claim 8, wherein:

the applying, in the first frame, data signals to each row of sub-pixels turned on comprises: applying, for M sub-pixels in the each odd-numbered row of sub-pixels turned on, the data signals to a sub-pixel located in a 2a−1th column and a sub-pixel located in a 2ath column, where a is an odd number, 1≤2a−1<M; and applying, for M sub-pixels in the each even-numbered row of sub-pixels turned on, the data signals to a sub-pixel located in a 2bth column and a sub-pixel located in a 2b+1th column, where b is an even number, 2≤2b≤M; and the applying, in the second frame, data signals to each row of sub-pixels turned on comprises: applying, for M sub-pixels in the each odd-numbered row of sub-pixels turned on, the data signals to a sub-pixel located in a 2bth column and a sub-pixel located in a 2b+1th column, where b is an even number, 2≤2b≤M; and applying, for M sub-pixels in the each even-numbered row of sub-pixels turned on, the data signals to a sub-pixel located in a 2a−1th column and a sub-pixel located in a 2ath column, where a is an odd number, 1≤2a−1<M.

12. A display device, comprising:

a plurality of sub-pixels arranged in an N×M array, where N is an integer greater than 1, and M is an integer greater than 1;

a gate driving circuit connected to the plurality of sub-pixels and configured to:

scan the plurality of sub-pixels progressively or at an interval of at least one row using gate driving signals, to turn on each row of sub-pixels scanned, so that a duration in which two rows of sub-pixels turned on sequentially are simultaneously in an ON state is greater than or equal to two times a unit scanning time, wherein the unit scanning time is a time required for scanning a row of sub-pixels; and a source driving circuit connected to the plurality of sub-pixels and configured to:

apply, in a first frame, data signals sequentially to each row of sub-pixels turned on, so that a duration of applying the data signals to a part of the plurality of sub-pixels is greater than the unit scanning time; and apply, in a second frame, data signals sequentially to each row of sub-pixels turned on, so that a duration of applying the data signals to the other part of the plurality of sub-pixels is greater than the unit scanning time, wherein a duration of an effective level of the gate driving signals is smaller than a duration of a non-effective level of the gate driving signals.

* * * * *